(12) United States Patent
Riley et al.

(10) Patent No.: US 11,319,218 B2
(45) Date of Patent: May 3, 2022

(54) SYSTEM FOR DECONTAMINATING WATER AND GENERATING WATER VAPOR

(71) Applicant: Verno Holdings, LLC, Las Vegas, NV (US)

(72) Inventors: John D. Riley, Santa Maria, CA (US); Dana L. Johnson, Ventura, CA (US); Harry Patrick Barnum, Ventura, CA (US)

(73) Assignee: Verno Holdings, LLC, Las Vegas, NV (US)

( * ) Notice: Subject to any disclaimer, the term of this patent is extended or adjusted under 35 U.S.C. 154(b) by 0 days.

(21) Appl. No.: 17/069,221

(22) Filed: Oct. 13, 2020

(65) Prior Publication Data
US 2021/0039964 A1   Feb. 11, 2021

Related U.S. Application Data

(60) Continuation-in-part of application No. 16/922,189, filed on Jul. 7, 2020, which is a continuation-in-part
(Continued)

(51) Int. Cl.
*C02F 1/04* (2006.01)
*B01D 1/22* (2006.01)
(Continued)

(52) U.S. Cl.
CPC ............ *C02F 1/048* (2013.01); *B01D 1/0082* (2013.01); *B01D 1/223* (2013.01); *B01D 1/225* (2013.01);
(Continued)

(58) Field of Classification Search
CPC .... C02F 1/048; C02F 1/08; C02F 1/18; C02F 2103/08; C02F 2209/005; C02F 2209/02;
(Continued)

(56) References Cited

U.S. PATENT DOCUMENTS 2,118,803 A   5/1938   Bowen
2,747,002 A   5/1956   Walker et al.
(Continued)

FOREIGN PATENT DOCUMENTS

DE   4106112 A1   9/1992
JP   5225307 B2   7/2013
(Continued)

OTHER PUBLICATIONS

International Search Report for International Application No. PCT/US2015/062604 dated of Apr. 22, 2016.
(Continued)

*Primary Examiner* — Jonathan Miller
(74) *Attorney, Agent, or Firm* — Kelly & Kelley, LLP

(57) ABSTRACT

A system and method for decontaminating a fluid and recovered vapor, particularly processing and recycling contaminated water, utilizing a vaporizer-desalination unit to separate a contaminated water flow into a contaminated disposal flow and a clean water vapor flow. The contaminated disposal flow may be dried and separated into recovered minerals utilizing heat from the clean water vapor flow to dry the contaminated disposal flow.

9 Claims, 30 Drawing Sheets

Related U.S. Application Data of application No. 16/256,144, filed on Jan. 24, 2019, now Pat. No. 10,730,762, which is a division of application No. 14/923,216, filed on Oct. 26, 2015, now Pat. No. 10,273,168, which is a continuation-in-part of application No. 14/096,334, filed on Dec. 4, 2013, now Pat. No. 9,169,132, which is a division of application No. 13/536,581, filed on Jun. 28, 2012, now Pat. No. 9,102,545, which is a continuation-in-part of application No. 12/488,750, filed on Jun. 22, 2009, now Pat. No. 8,562,791.

(51) Int. Cl.
| | | |
|---|---|---|
| *B01D 1/24* | (2006.01) | |
| *B01D 1/00* | (2006.01) | |
| *B01D 3/08* | (2006.01) | |
| *C02F 1/08* | (2006.01) | |
| *F03B 13/00* | (2006.01) | |
| *F22B 3/06* | (2006.01) | |
| *C02F 103/08* | (2006.01) | |
| *C02F 1/18* | (2006.01) | |

(52) U.S. Cl.
CPC ............. *B01D 1/228* (2013.01); *B01D 1/24* (2013.01); *B01D 3/08* (2013.01); *C02F 1/08* (2013.01); *F03B 13/00* (2013.01); *F22B 3/06* (2013.01); *C02F 1/18* (2013.01); *C02F 2103/08* (2013.01); *C02F 2209/005* (2013.01); *C02F 2209/02* (2013.01); *C02F 2209/40* (2013.01); *C02F 2209/42* (2013.01); *Y02A 20/00* (2018.01); *Y02A 20/124* (2018.01); *Y02W 10/37* (2015.05)

(58) Field of Classification Search
CPC ............ C02F 2209/40; C02F 2209/42; B01D 1/0082; B01D 1/223; B01D 1/225; B01D 1/228; B01D 1/24; B01D 3/08; F22B 3/06

See application file for complete search history.

(56) References Cited

U.S. PATENT DOCUMENTS

| | | | |
|---|---|---|---|
| 3,213,001 | A | 10/1965 | Schmidt |
| 3,230,730 | A | 1/1966 | Hanson |
| 3,349,828 | A | 10/1967 | Monty |
| 3,373,089 | A | 3/1968 | Vautrain et al. |
| 3,507,577 | A | 4/1970 | Swearingen |
| 3,613,368 | A | 10/1971 | Doerner |
| 3,717,554 | A | 2/1973 | Ruthrof |
| 3,733,816 | A | 5/1973 | Nash et al. |
| 4,287,026 | A | 9/1981 | Wallace |
| 4,313,784 | A | 2/1982 | Haley |
| 4,443,331 | A | 4/1984 | Julien Saint Amand |
| 4,566,947 | A | 1/1986 | Tsurata |
| 4,802,826 | A | 2/1989 | Hall |
| 4,877,536 | A * | 10/1989 | Bertness ............... C02F 1/02 210/712 |
| 4,891,140 | A | 1/1990 | Burke, Jr. |
| 4,959,122 | A | 9/1990 | Kurematsu et al. |
| 5,007,798 | A | 4/1991 | Keane |
| 5,045,155 | A | 9/1991 | Ramsland |
| 5,118,388 | A | 6/1992 | Aboul-Nasr |
| 5,396,884 | A | 3/1995 | Bagwell et al. |
| 5,645,693 | A | 7/1997 | Gode |
| 5,810,975 | A | 9/1998 | Bourdel |
| 5,888,453 | A | 3/1999 | Luker |
| 5,968,321 | A | 10/1999 | Sears |
| 6,080,218 | A | 6/2000 | Pirkle |
| 6,129,529 | A | 10/2000 | Young et al. |
| 6,689,251 | B2 | 2/2004 | Zebuhr |
| 6,733,636 | B1 | 5/2004 | Heins |
| 7,150,807 | B2 | 12/2006 | Genser |
| 7,214,290 | B2 | 5/2007 | Duesel, Jr. et al. |
| 7,438,129 | B2 | 10/2008 | Heins |
| 7,498,175 | B2 | 3/2009 | Cole |
| 7,540,944 | B2 | 6/2009 | Bitterly et al. |
| 7,681,436 | B2 | 3/2010 | Biberger |
| 7,681,643 | B2 | 3/2010 | Heins |
| 7,717,174 | B2 | 5/2010 | Heins |
| 7,749,360 | B2 | 7/2010 | Waldron |
| 7,927,464 | B2 | 4/2011 | Gsell et al. |
| 7,967,955 | B2 | 6/2011 | Heins |
| 8,206,557 | B2 | 6/2012 | Burke et al. |
| 8,562,791 | B2 | 10/2013 | Riley et al. |
| 9,102,545 | B2 | 8/2015 | Riley et al. |
| 9,169,132 | B2 | 10/2015 | Riley et al. |
| 10,730,762 | B2 | 8/2020 | Riley et al. |
| 10,787,890 | B2 | 9/2020 | Moore et al. |
| 2002/0092757 | A1 | 7/2002 | Zebuhr |
| 2003/0010691 | A1 | 1/2003 | Broussard |
| 2003/0127400 | A1 | 7/2003 | Krensnyak et al. |
| 2005/0016828 | A1 | 1/2005 | Bednarek et al. |
| 2005/0031443 | A1 | 2/2005 | Ohlsson et al. |
| 2005/0129559 | A1 | 6/2005 | Hasegawa et al. |
| 2007/0193872 | A1 | 8/2007 | Garcia et al. |
| 2007/0235317 | A1 | 10/2007 | Waldron |
| 2008/0210384 | A1 | 9/2008 | Guthrie |
| 2009/0139192 | A1 | 6/2009 | Sams et al. |
| 2009/0313996 | A1 | 12/2009 | Riley et al. |
| 2010/0116756 | A1 | 5/2010 | Fletcher |
| 2011/0094940 | A1 | 4/2011 | Weisselberg |
| 2012/0138447 | A1 | 6/2012 | Glynn |
| 2012/0160187 | A1 | 6/2012 | Bunio et al. |
| 2012/0186970 | A1 | 7/2012 | Jaeger |
| 2016/0214878 | A1 | 7/2016 | Weimer et al. |
| 2018/0312409 | A1 | 11/2018 | Kats |
| 2019/0152804 | A1 | 5/2019 | Riley et al. |
| 2020/0339440 | A1 | 10/2020 | Riley et al. |
| 2021/0039964 | A1 | 2/2021 | Riley et al. |

FOREIGN PATENT DOCUMENTS

| | | |
|---|---|---|
| JP | 2013-249658 A | 12/2013 |
| WO | 2003/095802 A1 | 11/2003 |
| WO | 2015/023009 A1 | 2/2015 |
| WO | 2017/074476 A1 | 5/2017 |
| WO | 2020/079274 A1 | 4/2020 |

OTHER PUBLICATIONS

International Search Report for International Application No. PCT/US2021/37795 dated of Sep. 24, 2021.
International Search Report for International Application No. PCT/US2021/040692 dated of Oct. 19, 2021.

\* cited by examiner

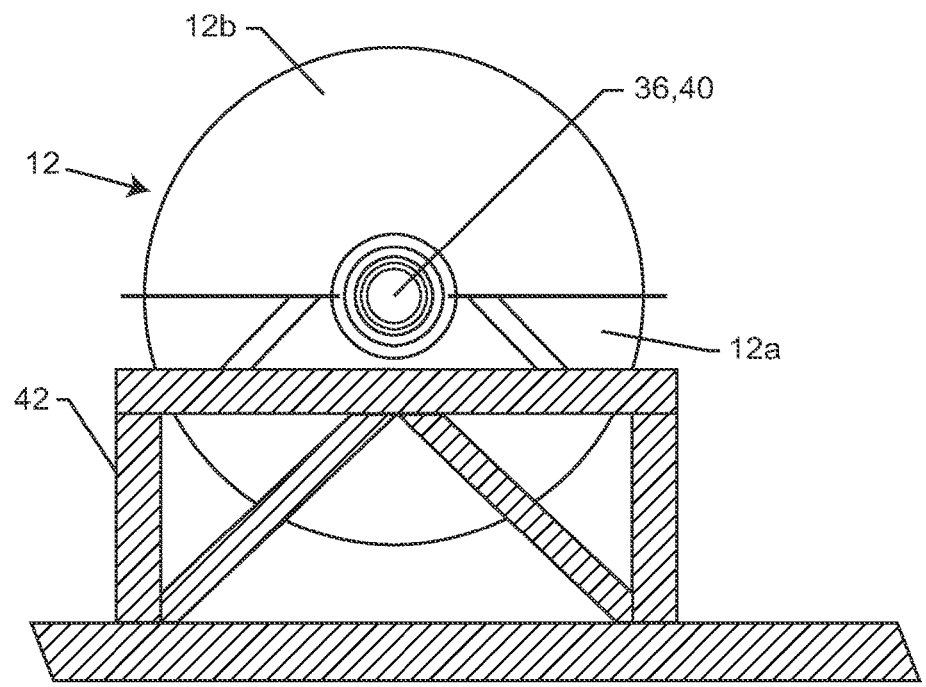
FIG. 4
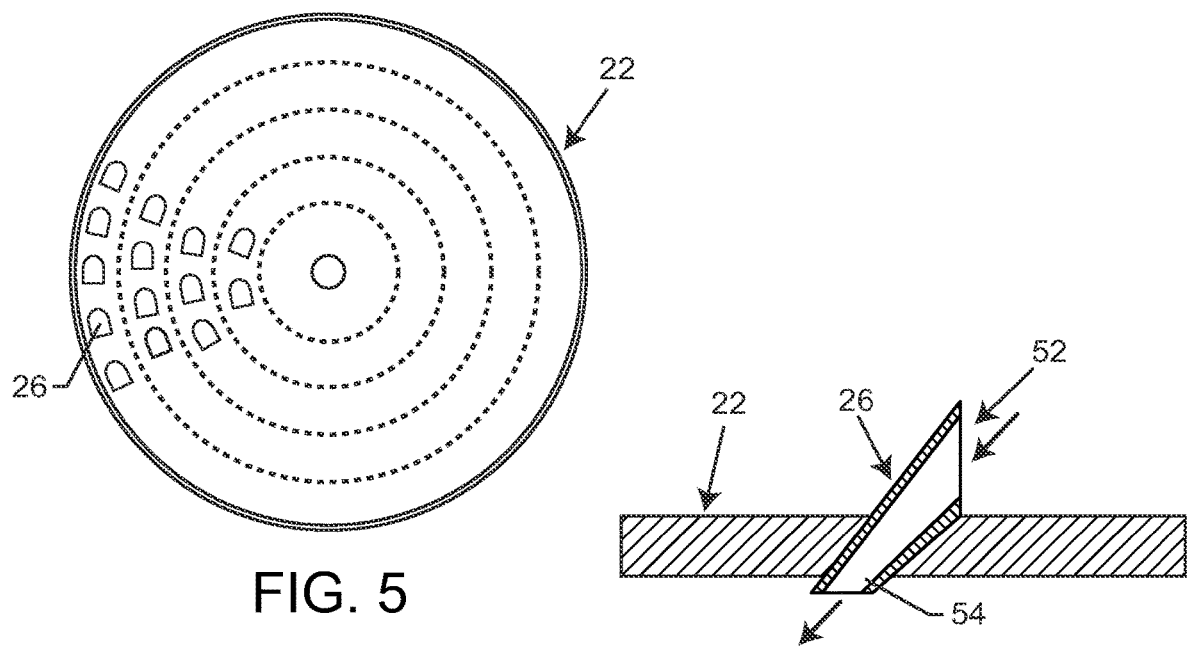
FIG. 5
FIG. 6

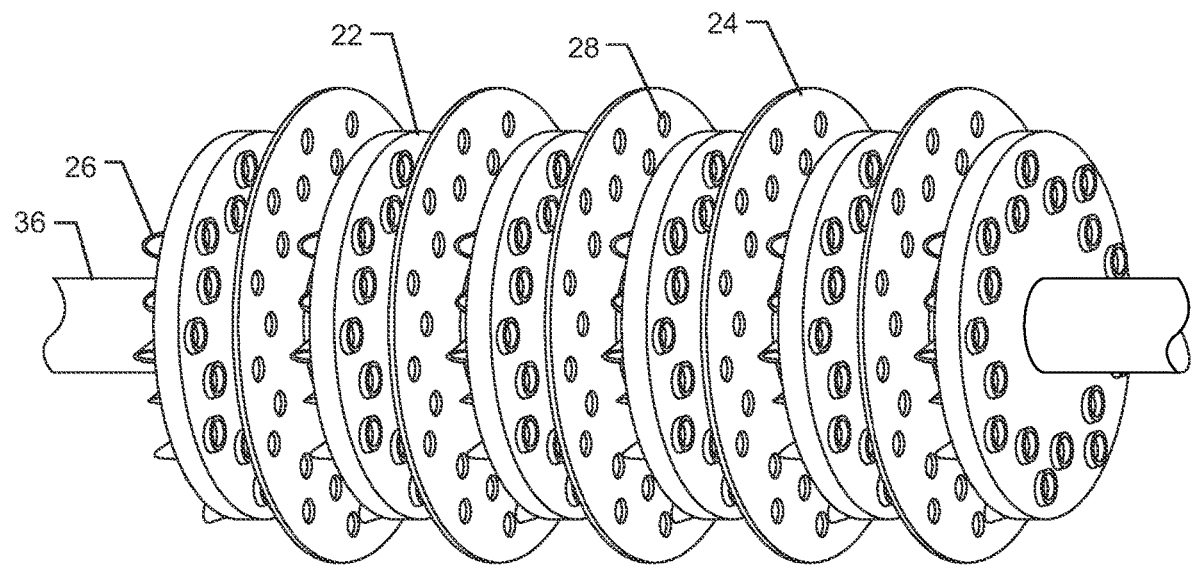
FIG. 19
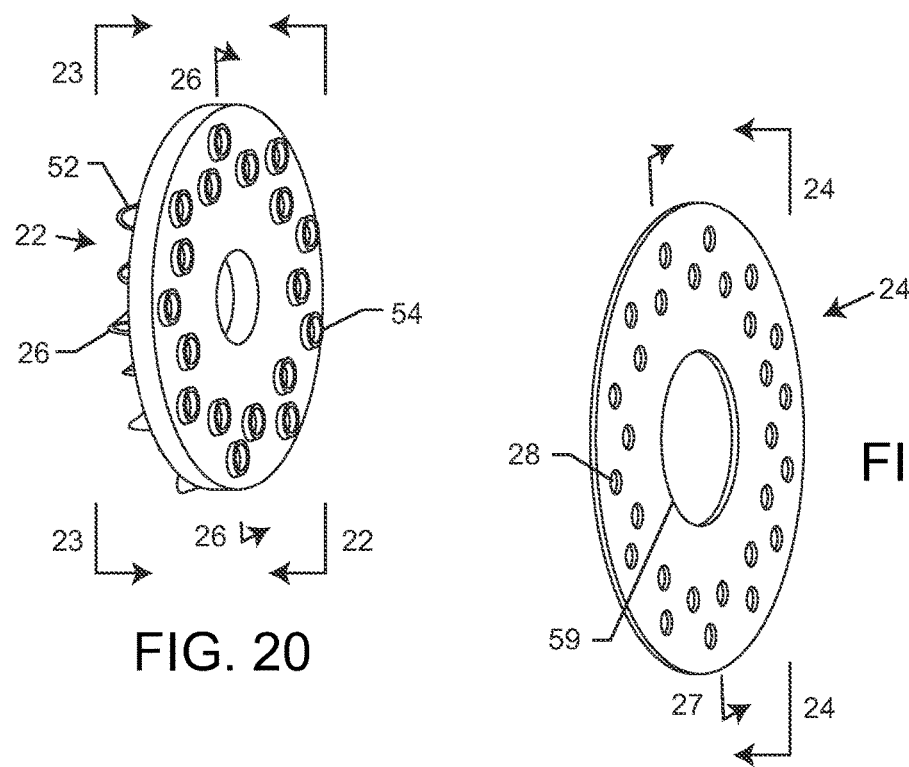
FIG. 20
FIG. 21

SYSTEM FOR DECONTAMINATING WATER AND GENERATING WATER VAPOR

RELATED APPLICATIONS

This Application is a continuation-in-part of U.S. application Ser. No. 16/922,189, filed Jul. 7, 2020, which was a continuation-in-part of U.S. application Ser. No. 16/256,144, filed Jan. 24, 2019 (now U.S. Pat. No. 10,730,762), which was a divisional of U.S. application Ser. No. 14/923,216, filed Oct. 26, 2015 (now U.S. Pat. No. 10,273,168), which was a continuation-in-part of U.S. application Ser. No. 14/096,334, filed Dec. 4, 2013 (now U.S. Pat. No. 9,169,132), which was a divisional of U.S. application Ser. No. 13/536,581, filed Jun. 28, 2012 (now U.S. Pat. No. 9,102,545), and was a continuation-in-part of U.S. application Ser. No. 12/488,750, filed Jun. 22, 2009 (now U.S. Pat. No. 8,562,791).

BACKGROUND OF THE INVENTION

The present invention relates to a system for decontaminating water and generating water vapor. More particularly, the present invention relates to an improved method that utilizes a series of sensors and a control system to vaporize water, remove dissolved solids and maximize recovery of potable water from contaminated water via a horizontal water processing vessel.

Desalinization (also desalination or desalinisation) refers to one of many processes for removing excess salt, minerals and other natural or unnatural contaminants from water. Historically, desalinization converted sea water into drinking water onboard ships. Modern desalinization processes are still used on ships and submarines to ensure a constant drinking water supply for the crew. But, desalinization is increasingly being used in arid regions having scarce fresh water resources. In these regions, salt water from the ocean is desalinated to fresh water suitable for consumption (i.e. potable) or for irrigation. The highly concentrated waste product from the desalinization process is commonly referred to as brine, with salt (NaCl) being a typical major by-product. Most modern interest in desalinization focuses on developing cost-effective processes for providing fresh water for use in arid regions where fresh water availability is limited.

Large-scale desalinization is typically costly and generally requires large amounts of energy and an expensive infrastructure. For example, the world's largest desalinization plant primarily uses multi-stage flash distillation and can produce 300 million cubic meters ($m^3$) of water per year. The largest desalinization plant in the United States desalinates 25 million gallons (95,000 $m^3$) of water per day. Worldwide, approximately 13,000 desalinization plants produce more than 12 billion gallons (45 million $m^3$) of water per day. Thus, there is a constant need in the art for improving desalinization methods, namely lowering costs and improving efficiency of the related systems.

Desalinization may be performed by many different processes. For example, several processes use simple evaporation-based desalinization methods such as multiple-effect evaporation (MED or simply ME), vapor-compression evaporation (VC) and evaporation-condensation. In general, evaporation-condensation is a natural desalinization process performed by nature during the hydrologic cycle. In the hydrologic cycle, water evaporates into the atmosphere from sources such as lakes, oceans and streams. Evaporated water then contacts cooler air and forms dew or rain. The resultant water is generally free from impurities. The hydrologic process can be replicated artificially using a series of evaporation-condensation processes. In basic operation, salt water is heated to evaporation. Salt and other impurities dissolve out from the water and are left behind during the evaporation stage. The evaporated water is later condensed, collected and stored as fresh water. Over the years, the evaporation-condensation system has been greatly improved, especially with the advent of more efficient technology facilitating the process. But, these systems still require significant energy input to evaporate the water. An alternative evaporation-based desalinization method includes multi-stage flash distillation, as briefly described above. Multi-stage flash distillation uses vacuum distillation. Vacuum distillation is a process of boiling water at less than atmospheric pressure by creating a vacuum within the evaporation chamber. Hence, vacuum distillation operates at a much lower temperature than MED or VC and therefore requires less energy to evaporate the water to separate the contaminants therefrom. This process is particularly desirable in view of rising energy costs.

Alternative desalinization methods may include membrane-based processes such as reverse osmosis (RO), electrodialisys reversal (EDR), nanofiltration (NF), forward osmosis (FO) and membrane distillation (MD). Of these desalinization processes, reverse osmosis is the most widely used. Reverse osmosis uses semi-permeable membranes and pressure to separate salt and other impurities from water. Reverse osmosis membranes are considered selective. That is, the membrane is highly permeable to water molecules while highly impermeable to salt and other contaminants dissolved therein. The membranes themselves are stored in expensive and highly pressurized containers. The containers arrange the membranes to maximize surface area and salt water flow rate therethrough. Conventional-osmosis desalinization systems typically use one of two techniques for developing high pressure within the system: (1) high-pressure pumps; or (2) centrifuges. A high-pressure pump helps filter salt water through the membrane. The pressure in the system varies according to the pump settings and osmotic pressure of the salt water. Osmotic pressure depends on the temperature of the solution and the concentration of salt dissolved therein. Alternatively, centrifuges are typically more efficient, but are more difficult to implement. The centrifuge spins the solution at high rates to separate materials of varying densities within the solution. In combination with a membrane, suspended salts and other contaminants are subject to constant radial acceleration along the length of the membrane. One common problem with reverse osmosis in general is the removal of suspended salt and clogging of the membrane over time.

Operating expenses of reverse osmosis water desalinization plants are primarily determined by the energy costs required to drive the high-pressure pump or centrifuge. A hydraulic energy recovery system may be integrated into the reverse osmosis system to combat rising energy costs associated with already energy intensive processes. This involves recovering part of the input energy. For example, turbines are particularly capable of recovering energy in systems that require high operating pressures and large volumes of salt water. The turbine recovers energy during a hydraulic pressure drop. Thus, energy is recovered in a reverse osmosis system based on pressure differentials between opposite sides of the membrane. The pressure on the salt water side is much higher than the pressure on the desalinated water side. The pressure drop produces considerable hydraulic energy recoverable by the turbine. Thus, the energy produced between high pressure and low pressure sections of the reverse osmosis membrane is harnessed and not completely wasted. Recovered energy may be used to drive any of the system components, including the high-pressure pump or centrifuge. Turbines help reduce overall energy expenditures to perform desalinization.

In general, reverse osmosis systems typically consume less energy than thermal distillation and is, therefore, more cost effective. While reverse osmosis works well with somewhat brackish water solutions, reverse osmosis may become overloaded and inefficient when used with heavily salted solutions, such as ocean salt water. Other, less efficient desalinization methods may include ionic exchange, freezing, geothermal desalinization, solar humidification (HDH or MEH), methane hydrate crystallization, high-grade water recycling or RF induced hyperthermia. Regardless of the process, desalinization remains energy intensive. Future costs and economic feasibility continue to depend on both the price of desalinization technology and the costs of the energy needed to operate the system.

In another alternative method of desalinization, U.S. Pat. No. 4,891,140 to Burke, Jr. discloses a method of separating and removing dissolved minerals and organic material from water by destructive distillation. Here, water is heated to a vapor under controlled pressure. Dissolved salt particles and other contaminants fall out of the solution as water evaporates. An integrated hydrocyclone centrifuge speeds up the separation process. The heated, high pressure clean water transfers energy back to the system through heat exchange and a hydraulic motor. Net energy use is therefore relatively lower than the aforementioned processes. In fact, net energy use is essentially equivalent to pump loss and heat loss from equipment operation. One particular advantage of this design is that there are no membranes to replace. This process removes chemicals and other matter that would otherwise damage or destroy membrane-based desalinization devices.

Another patent, U.S. Pat. No. 4,287,026 to Wallace, discloses a method and apparatus for removing salt and other minerals in the form of dissolved solids from salt and other brackish waters to produce potable water. Water is forced through several desalinization stages at high temperature and at high centrifugal velocities. Preferably, the interior components spin the water at speeds up to Mach 2 to efficiently separate and suspend dissolved salt and other dissolved solids from the vaporized water. The suspended salt and other minerals are centrifugally forced outward to be discharged separately from the water vapor. The separated and purified vapor or steam is then condensed back to potable water. The system requires significantly less operational energy than reverse osmosis and similar filtration systems to efficiently and economically purify water. One drawback of this design is that the rotating shaft is built into a vertical chamber. As a result, the rotating shaft sections are only solidly anchored to the base unit by a bearing and a bearing cap. At high rotational speeds (e.g. over Mach 1), vibrations cause excessive bearing shaft and seal failure. Another drawback is that a series of chambers are bolted together in housing sections. The perforated plates are coupled to these sections by an O-ring seal. The housing and O-ring seals tend to wear over time due to salt penetration because the multiple chambers and housing sections are connected via a plurality of nuts and bolts. In particular, the assembly of the Wallace design is particularly laborious. Maintenance is equally labor intensive as it takes significant time to disassemble each of the housing sections, including the O-rings, nuts and bolts. Of course, the device must be reassembled after the requisite maintenance is performed. Each housing section must be carefully put back together to ensure proper sealing therebetween. The system is also prone to a variety of torque and maintenance problems as the device ages, such as O-ring leakage. Moreover, the rotating shaft is connected to the power source by a gear drive, which contributes to the aforementioned reliability problems associated with the bearings, shafts and seals. The system also fails to disclose a means for regulating the speed of the rotating shaft sections according to the osmotic pressure of the salt water being desalinated. The static operation of the Wallace desalinization machine is therefore not as efficient as other modern desalinization devices.

Thus, there is a need in the art for an improved system that includes sensors for monitoring real-time system information and controls for adjusting the mechanical operation of the system to maximize decontamination of the water, such as desalinization of the water, and minimize energy consumption. Such a system should further incorporate multiple recycling cycles to increase the recovery of potable water from approximately eighty percent to between approximately ninety-six percent to ninety-nine percent, should incorporate a polymer aided recovery system to extract trace elements of residue compounds and should consume less energy than other desalinization systems known in the art. The present invention fulfills these needs and provides further related advantages.

SUMMARY OF THE INVENTION

The present invention is directed to a system for processing fluids, such as decontaminating or desalinating wastewater, and generating water vapor, including steam. The system for decontaminating a wastewater source begins with a waste water source fluidly connected to an inlet on a waste water filter-strainer device producing a filtered wastewater flow. A separation tank is fluidly connected to an outlet on the waste water filter-strainer device, wherein the separation tank divides the filtered wastewater flow into a heavy fraction, a light fraction, and an intermediate fraction. A first decontamination unit comprising a generally horizontal elongated vessel having a plurality of alternately spaced rotating trays and fixed baffles disposed vertically along the elongated vessel between a first end of the elongated vessel proximate to a first wastewater inlet and a second end of the elongated vessel proximate to a first contaminant outlet and a first vapor outlet. The first wastewater inlet on the first decontamination unit is fluidly connected to an intermediate outlet on the separation tank and separates the intermediate fraction into a contaminant flow to the first contaminant outlet and a decontaminated vapor flow to the first vapor outlet.

A contaminant tank is fluidly connected to the first contaminant outlet, and heat exchanger tubes are fluidly connected to the first vapor outlet and thermally connected to the contaminant tank. Heat from the decontaminated vapor flow in the heat exchanger tubes dries the contaminant flow in the contaminant tank to a contaminant mineral residue. A decontaminated water recovery tank is fluidly connected to the heat exchanger tubes after the contaminant tank. A mineral separator is connected to an outlet on the contaminant tank, wherein the mineral separator separates the contaminant mineral residue into commercial minerals.

A recycle line fluidly connects the first contaminant outlet to the first wastewater inlet on the first decontamination unit. The recycle line diverts at least seventy-five percent of the contaminant flow to the first wastewater inlet.

Within the decontamination unit, each of the rotating trays has a plurality of scoops each having an inlet of a first diameter and an outlet of a second smaller diameter, and each of the fixed baffles has a plurality of apertures each having an inlet of a first diameter and an outlet of a second smaller diameter. The purification unit may further include an internal sleeve disposed in the elongated vessel downstream of the plurality of alternately spaced rotating trays and fixed baffles, the internal sleeve forming an annular passageway to the first contaminate outlet.

The system may include a second decontamination unit having a generally horizontal elongated vessel having a plurality of alternately spaced rotating trays and fixed baffles disposed vertically along the elongated vessel between a first end of the elongated vessel proximate to a second wastewater inlet and a second end of the elongated vessel proximate to a second contaminant outlet and a second vapor outlet. The second wastewater inlet is fluidly connected to the first contaminant outlet on the first decontamination unit, the second contaminant outlet is fluidly connected to the contaminant tank, and the second vapor outlet is fluidly merged with the first vapor outlet. Each of the plurality of trays in the second decontamination unit has a plurality of scoops each having an inlet of a first diameter and an outlet of a second smaller diameter, and each of the plurality of baffles in the second contamination unit has a plurality of apertures each having an inlet of a first diameter and an outlet of a second smaller diameter.

The present invention is also directed to a process for decontaminating a wastewater source. The process begins with screen filtering the wastewater source producing a filtered wastewater flow. The filtered wastewater flow is separated into a heavy fraction, a light fraction, and an intermediate fraction in a density separation tank. The intermediate fraction is processed through a decontamination unit, wherein the decontamination unit separates the intermediate fraction into a contaminant flow and a decontaminated vapor flow. The contaminant flow is dried in a heat exchanger unit using heat from the decontaminated vapor flow. The decontaminated vapor flow is then condensed into purified water, and the dried contaminant flow is processed to recover minerals therefrom.

The process further includes recycling a portion of the contaminant flow back through the decontamination unit. The recycled portion of the contaminant flow through the decontamination unit comprises at least 75% of the contaminant flow. The process further includes processing the contaminant flow through a second decontamination unit, wherein the second decontamination unit separates the contaminant flow into a concentrated contaminant flow and a second decontaminated vapor flow. Having a second decontamination unit includes combining the decontaminated vapor flow with the second decontaminated vapor flow and the drying step comprises drying the concentrated contaminant flow in the heat exchanger using heat from the combined decontaminated vapor flow and second decontaminated vapor flow.

The decontamination unit preferably has a generally horizontal elongated vessel having a plurality of alternately spaced rotating trays and fixed baffles disposed vertically along the elongated vessel between a first end and a second end of the elongated vessel. The plurality of alternately spaced rotating trays and fixed baffles may further include a plurality of scoops on each of the plurality of rotating trays, each scoop having an inlet of a first diameter and an outlet of a second smaller diameter, and a plurality of apertures on each of the plurality of fixed baffles, each aperture having an inlet of a first diameter and an outlet of a second smaller diameter. The decontamination unit may include an internal sleeve disposed in the elongated vessel downstream of the plurality of alternately spaced rotating trays and fixed baffles, the internal sleeve forming an annular passageway to the contaminate outlet.

In the decontamination unit, at least one of the trays may include a flow director extending from a front face thereof and configured to direct flow of the fluid towards a periphery of the tray. A rotatable shaft passes through the baffles, and is attached to the tray so as to rotate the trays within the inner chamber, while the baffles remain stationary. A drive rotates the shaft. Typically, a gap or a layer or sleeve of low friction material, or bearings, is disposed between the baffles and the shaft.

In one preferred embodiment, a controller may be used to adjust the speed of rotation of the shaft or the water input into the vessel. At least one sensor is in communication with the controller. At least one sensor is configured to determine at least one of: 1) speed of rotation of the shaft or trays, 2) pressure of the inner chamber, 3) temperature of the fluid, 4) fluid input rate, or 5) level of contaminates in the fluid to be processed.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is an end view of the horizontal water processing vessel attached to a portable framework, in accordance with the present invention;

FIG. 5 is a top view of a rotating tray having a plurality of scoops therein;

FIG. 6 is a cross-sectional view of a portion of the tray and a scoop thereof;

FIG. 19 is an illustration of the shaft with trays and baffles of the system of FIG. 15;

FIG. 20 is an illustration of a tray of the system of FIG. 15;

FIG. 21 is an illustration of a baffle of the system of FIG. 15;

DETAILED DESCRIPTION OF THE PREFERRED EMBODIMENTS

Figure 1:
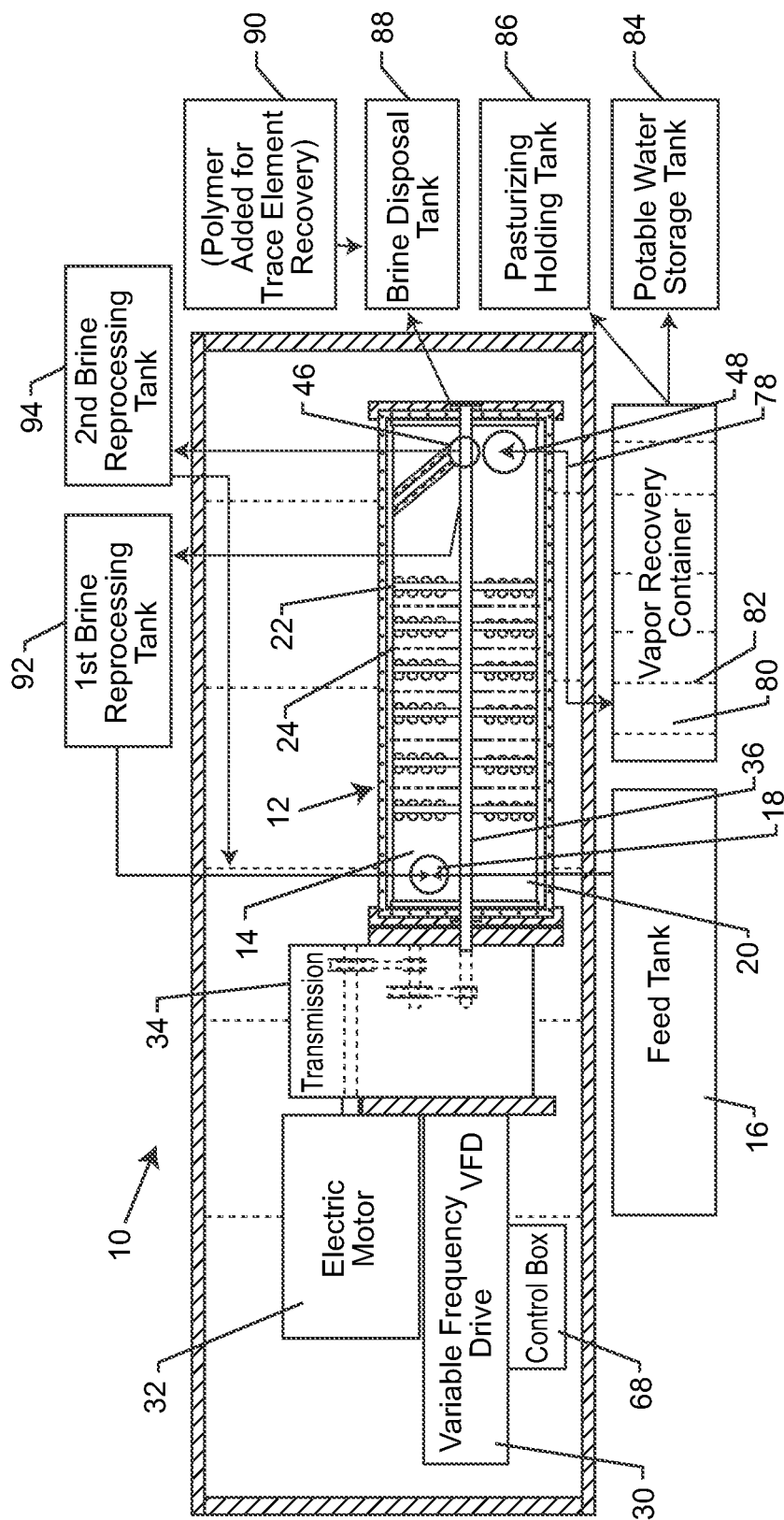
FIG. 1 is a top schematic, and partially sectioned, view of a system for decontaminating water and generating water vapor, in accordance with the present invention.

As shown in the drawings, for purposes of illustration, the present invention resides in a system and method for decontaminating water and generating water vapor. The method and system of the present invention is particularly suitable for desalinization of salt water, such as ocean or other brackish waters, as well as river water or other liquids/slurries. This preferred treatment will be used for exemplary purposes herein, although it will be understood by those skilled in the art that the system and method of the present invention could be used to decontaminate other water sources. The present invention may be used to remove dissolved or suspended solids (decontamination), as well as heavy metals and other pollutants. Moreover, as will be more fully described herein, the system and method of the present invention can be used in association with relatively clean water to create water vapor, in the form of steam, which has a sufficient pressure and temperature so as to be passed through a turbine which is operably connected to an electric generator for the generation of electricity, or other steam heating applications.

In the following description, multiple embodiments of the inventive method and system for decontaminating water and generating water vapor are described. Throughout these embodiments and with reference to the drawing figures, functionally equivalent components will be referred to using identical reference numerals.

Figure 2:
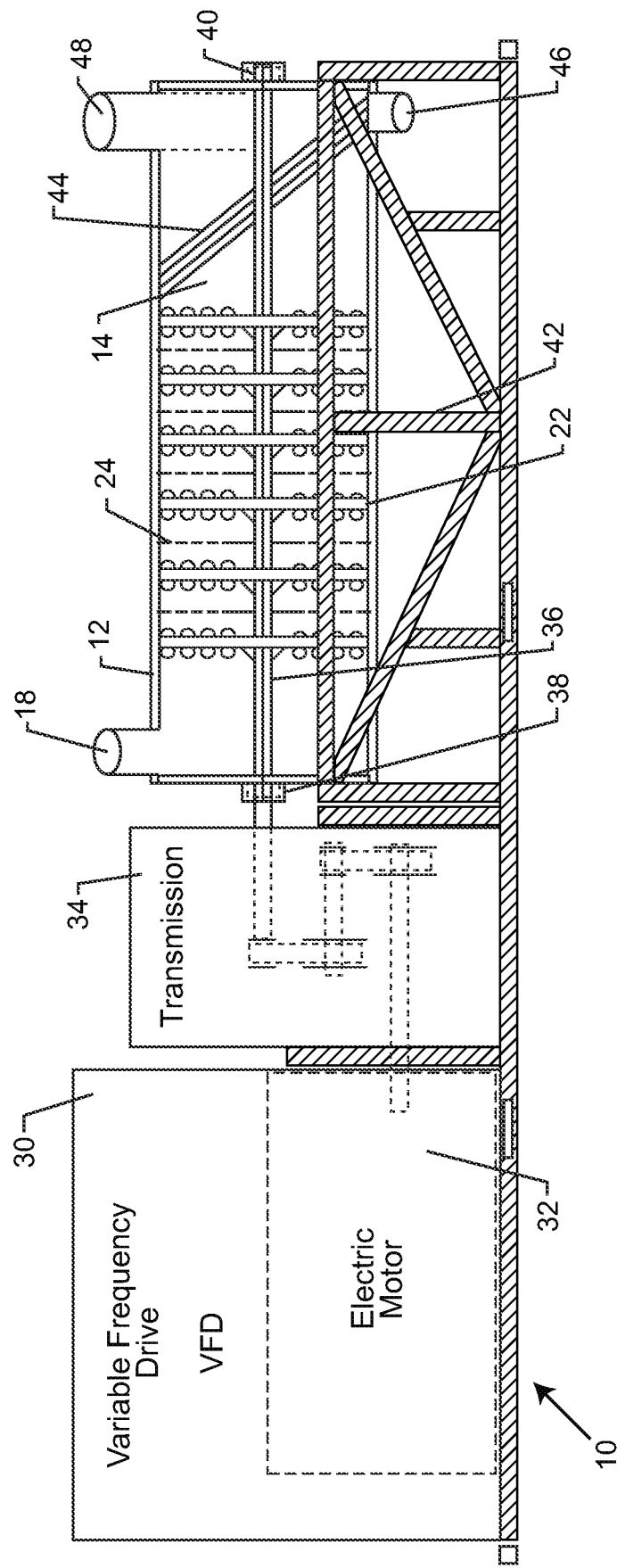
FIG. 2 is a side schematic, and partially sectioned, view of the system of FIG. 1.

With reference now to FIGS. 1 and 2, the system—a vaporization-desalination unit—generally referred to by the reference number 10, includes a water processing vessel or chamber 12 defining an inner chamber 14, wherein salt and other dissolved solids and contaminants are removed from the water to produce essentially mineral-free, potable water. In one embodiment, the processing vessel 12 receives contaminated water from a feed tank 16 through an inlet valve 18 via a feed tank tube 20. In this illustration, the inlet valve 18 enters the vessel 12 laterally through a side wall. This inlet valve 18 can be alternately positioned as described below. The source of water can be sea or ocean water, other brackish waters, or even water which is contaminated with other contaminants. Moreover, the present invention envisions supplying the contaminated water directly from the source, wherein the feed tank 16 may not necessarily be used.

Figure 3:
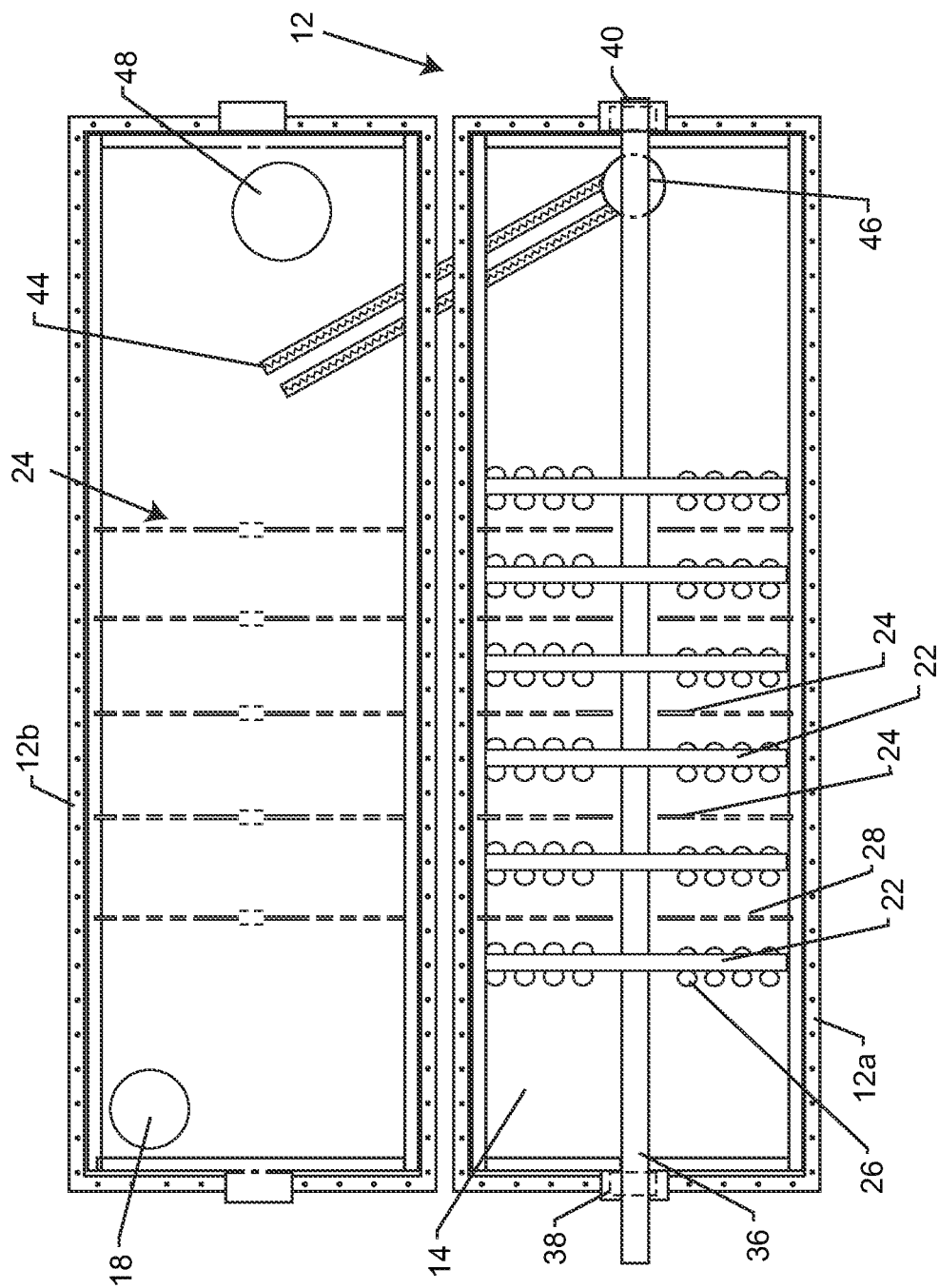
FIG. 3 is a top view illustrating the water processing vessel having an upper portion thereof opened.

With reference now to FIG. 3, in one embodiment, the vessel 12 is comprised of a lower shell and an upper shell portion 12b such that the lower and upper shell portions 12a and 12b can be opened or removed relative to one another so as to access the contents within the inner chamber 14 of the vessel 12. The vessel 12 may also be constructed as a single unit as opposed to lower and upper shell portions. The water processing vessel 12 includes, within the inner chamber 14 a plurality of rotatable trays 22 spaced apart from one another and having a baffle 24 disposed between each pair of trays 22. As will be more fully explained herein, the rotatable trays 22 include a plurality of scoops 26 formed therethrough and the baffles 24 typically comprise plates having a plurality of apertures 28 formed therethrough. The baffles 24 are fixed to the vessel 12 so as to be stationary. The baffles 24 may comprise a lower portion disposed in the lower shell 12*a* of the vessel and an upper portion attached to and disposed in the upper shell 12*b* of the vessel 12 and designed to form a single baffle when the lower and upper shells 12*a* and 12*b* of the vessel 12 are in engagement with one another and closed. Alternatively, each baffle 24 may comprise a single piece that is attached to either the lower shell 12*a* or the upper shell 12*b* in the earlier embodiment or at multiple points in the single unit embodiment. In either embodiment, the baffle 24 will remain generally stationary as the water and water vapor is passed therethrough.

As shown in FIGS. 2, 10, 11, and 12, a variable frequency drive 30 may regulate the speed at which electric motor 32 drives a transmission 34 and a corresponding shaft 36. The shaft 36 is rotatably coupled to bearings or the like, typically non-friction bearings lubricated with synthetic oil, Schmitt couplers, or ceramic bearings 38 and 40 at generally opposite ends of the vessel 12. The shaft 36 extends through the trays 22 and baffles 24 such that only the trays 22 are rotated by the shaft 36. That is, the trays 22 are coupled to the shaft 36. Bearings, or a low-friction material, such as a layer or sleeve of Teflon is disposed between the rotating shaft 36 and the aperture plate baffle 24 to reduce friction therebetween, yet stabilize and support the spinning shaft 36. Teflon is not preferred as it could fray and contaminate the fluid.

Figure 2A:
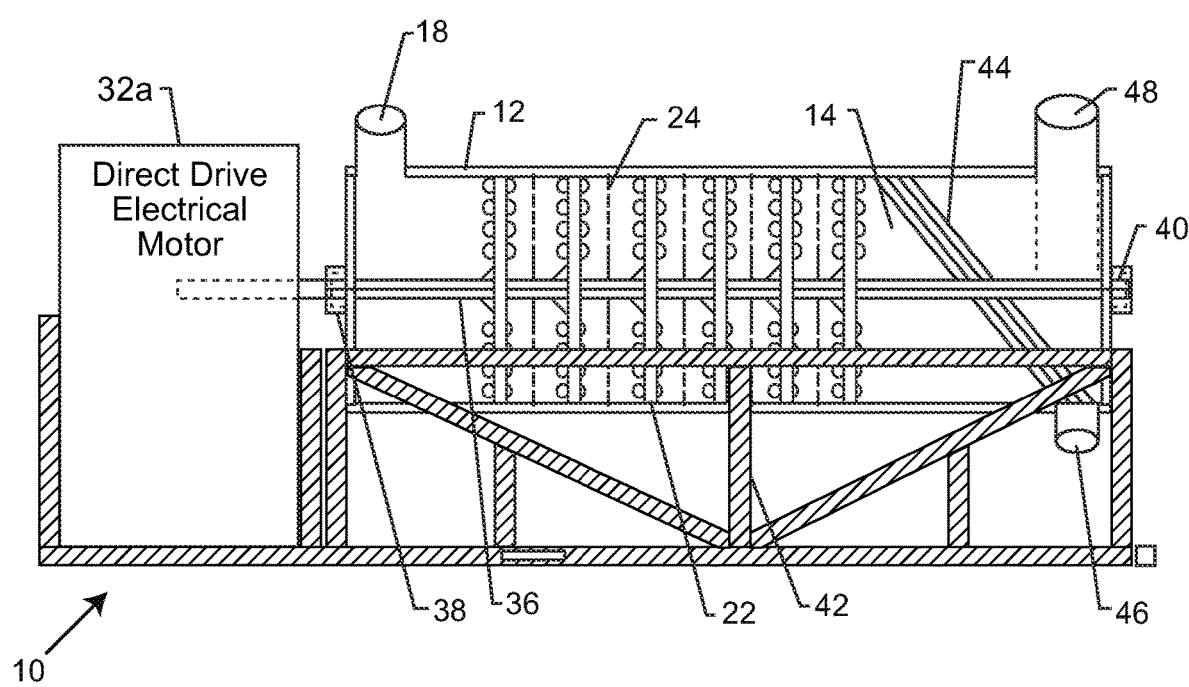
FIG. 2A is a view similar to FIG. 2 illustrating an alternative arrangement where the system 10 is controlled by a direct drive motor that is directly coupled to one end of a shaft.
Figure 12:
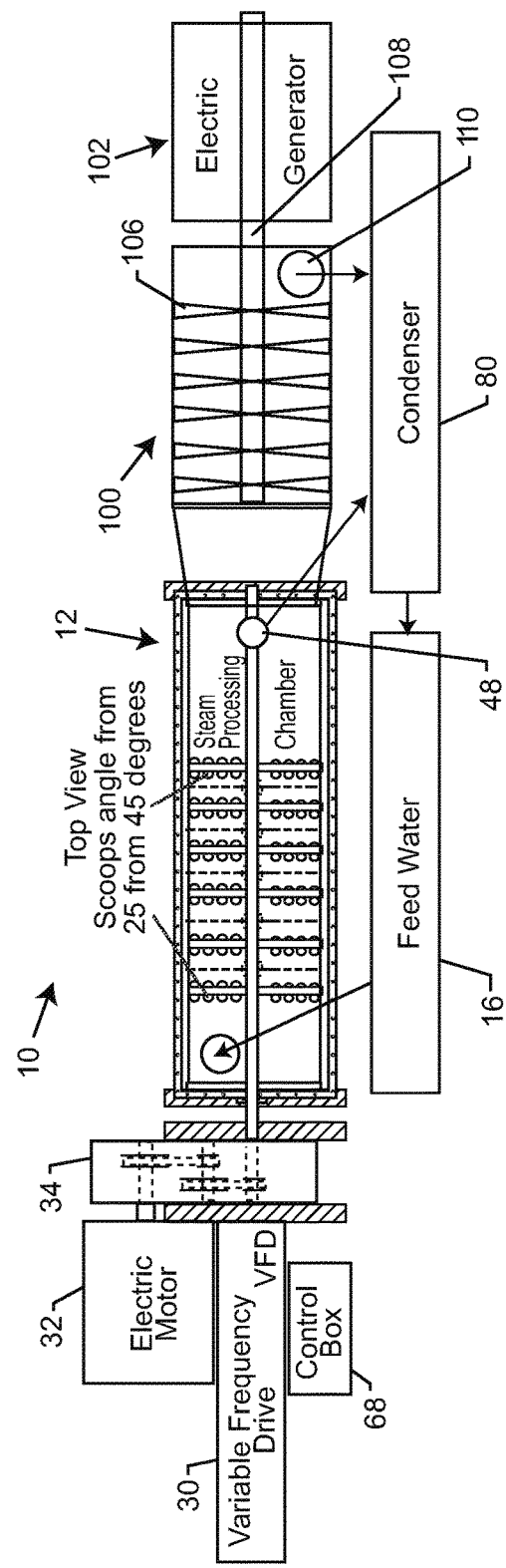
FIG. 12 is a top schematic view of the system of the present invention, incorporating a turbine and electric generator.
Figure 12A:
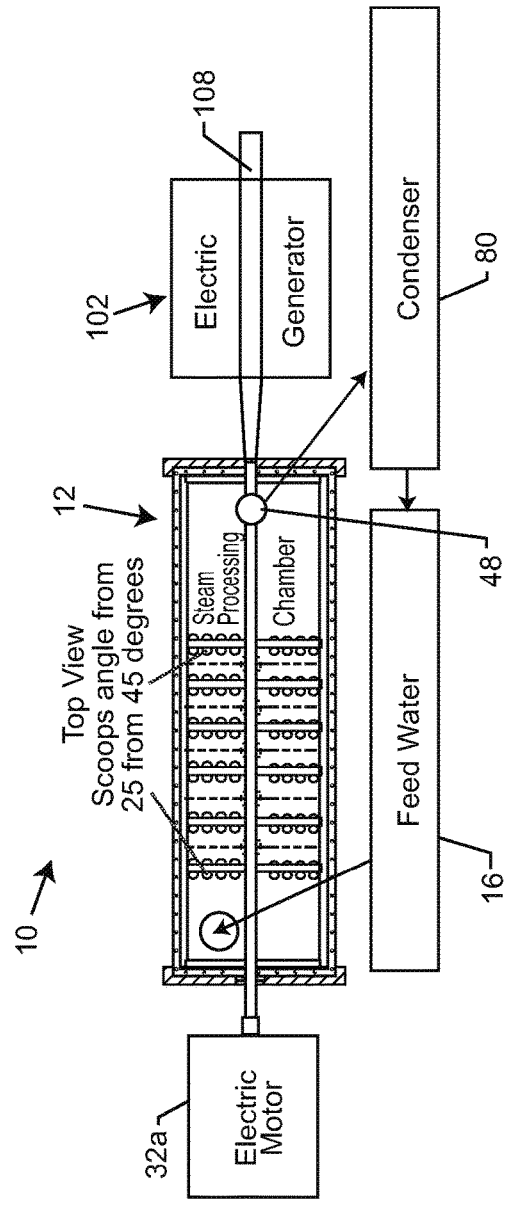
FIG. 12A is a view similar to FIG. 12 illustrating that the system may be controlled by direct drive motor that is directly coupled to one end of a shaft.

Alternatively, as shown in FIGS. 2A and 12A, the system 10 may be controlled by a direct drive motor 32*a* that is directly coupled to one end of the shaft 36. The direct drive motor 32*a* allows for the use of high speed electric motors or gas turbine direct drive. By using a direct drive motor 32*a* one can avoid the step down in power and force associated with the resistance inherent in transmission gearing. For example, in a typical geared drive system a motor at 200 HP and 300 ft-lb could produce rotor parameters of 60 HP and 90 ft-lb after gearing. In contrast, a direct drive motor would only need to provide 60 HP and 90 ft-lb to achieve the same parameters at the rotor—no step down is experienced because the gearing in the transmission is eliminated.

Although the inventive system 10 with a geared drive transmission may be prepared as fixed installation or a mobile installation, as on a trailer, the elimination of the transmission in a direct drive system facilitates the mobile aspect of the system 10. A smaller, more compact direct drive system 10 fits more easily on a trailer that is more easily mobile and transported from site to site.

As can be seen from the drawings, the water processing vessel 12 is oriented generally horizontally. This is in contrast to the Wallace '026 device wherein the water processing chamber was oriented generally vertically, and the top of the rotating shaft was secured by a bearing and a bearing cap, which supported the chamber itself. As a result, the rotating shaft sections were only solidly anchored to the base of the unit. At high rotational operating speeds, vibrations within the system cause excessive bearing, shaft and seal failure. In contrast, horizontally mounting the water processing vessel 12 to a frame structure 42 distributes the rotational load along the length of the vessel 12 and reduces vibrations, such as harmonic vibrations, that could otherwise cause excessive bearing, shaft and seal failures. Moreover, mounting the vessel 12 to the frame structure 42 enhances the portability of the system 10, as will be more fully described herein. Supporting the very rapidly rotating shaft 36 through each baffle 24 further stabilizes the shaft and system and reduces vibrations and damage caused thereby.

As mentioned above, the shaft 36, and trays 22 are rotated at a very high speed, such as Mach 2, although slower speeds such as Mach 1.7 have proven effective. This moves the water through the scoops 26 of the trays 22, which swirls and heats the water such that a water vapor is formed, and the contaminants, salts, and other dissolved solids are left behind and fall out of the water vapor. Most of the intake water is vaporized by 1) vacuum distillation and 2) cavitation created upon impact with the first rotating tray 22, the centrifugal and axial flow compression causes the temperatures and pressures to increase as there is a direct correlation between shaft RPM and temperature/pressure increases or decreases. The water and water vapor is then passed through the apertures 28 of the baffles 24 before being processed again through the next rotating tray 22 with scoops 26. The configurations of the trays 22 and baffles 24 are designed to minimize or eliminate drag and friction in the rotation of the shaft 36 by providing sufficient clearance at the perimeter of the trays 22 and through the central opening 59 of the baffles 24. At the same time leakage around the perimeter of the trays 22 and through the central opening 59 of the baffles 24 is to be minimized so as to increase efficiency.

As the water and water vapor passes through each subchamber of the vessel 12, the temperature of the water vapor is increased such that additional water vapor is created and leaves the salts, dissolved solids, and other contaminants behind in the remaining water. The centrifugal forces on the water and contaminants force it to the wall of the inner chamber 14 and into a set of channels 44 which direct the contaminants and non-vaporized water to an outlet 46. The water vapor which is generated passes through a water vapor outlet 48 formed in the vessel 12. Thus, the water vapor and the contaminants and remaining water are separated from one another. It is important to note that the system 10 produces water vapor—not steam. The water vapor is created through a combination of decreased pressure and increased temperature. The system 10 maintains the temperature of the water vapor at temperatures equal to or less than that of steam, thus avoiding the latent heat of vaporization and the additional energy necessary to convert liquid water to steam. Because of this, the energy required to return the water vapor to liquid water is correspondingly lower.

As mentioned above, the trays 22 are rotated by the shaft 36. The shaft 36 is supported within the interior of the water processing vessel 12 by a plurality of bearings, as mentioned above. The bearings are typically non-friction bearings lubricated with synthetic oil, steel, or ceramic. Prior art desalinization systems incorporate standard roller bearings which would fail under high rotational speeds and high temperatures. Thus, desalinization systems known in the prior art had high failure rates associated with standard roller bearings. In the present invention, the lubricated non-friction bearings, sealed steel ball bearings, or ceramic bearings 38 and 40 are more durable than standard roller bearings and fail less often under high rotational speeds and temperatures. The bearings 38, 40 may include internal lubrication tubes to allow for lubricant flow therethrough to minimize wear and tear from operation. The bearings 38, 40 also include vibrational sensors (as described below) to monitor and minimize the amount of vibration occurring during operation. Moreover, the shaft 36 may be intermittently supported by the low friction materials, such as Teflon sleeves or bearings 50 disposed between the baffle plate 24 and the shaft 36. This further ensures even distribution of weight and forces on the shaft 36 and improves the operation and longevity of the system.

With particular reference now to FIGS. 5 and 6, an exemplary tray 22 is shown, having a plurality of scoops 26 formed therethrough. Although fourteen scoops 26 are illustrated in FIG. 5, it will be appreciated that the number may vary and can be several dozen in a single tray 22, thus the dotted line represents multiple scoops of a variety of numbers.

FIG. 6 is a cross-sectional view of the tray 22 and the scoop 26 formed therein. In a particularly preferred embodiment, the scoops 26 are tapered such that a diameter of an inlet 52 thereof is greater than the diameter of an outlet 54 thereof. The tapered scoop 26 is essentially a Venturi tube that has the vertical opening or inlet 52 substantially perpendicular to the horizontal surface of the rotating tray base 22. Liquid and vapor accelerates through the tapered scoop 26 because the tapered scoop has a larger volume at the entrance 52 thereof and a smaller volume at the exit or outlet 54 thereof. The change in volume from the inlet to the outlet of the tapered scoop 26 causes an increase in velocity due to the Venturi effect. As a result, the liquid water and water vapor is further accelerated and agitated, resulting in increases in temperature and pressure. This further enables separation of the contaminants from within the water vapor. The tapered scoop 26 may be attached to the rotating tray 22 by any means known in the art.

Once again, it will be appreciated that there will be more or less tapered scoops 26 distributed in the entire area of the rotating tray 22, the particular number and size of the scoops 26 will vary depending upon the operating conditions of the system 10 of the present invention. Moreover, the angle of the scoop 26, illustrated as approximately forty-five degrees in FIG. 6, can be varied from tray to tray 22. That is, by increasing the angle of the spinning scoop, such as by twenty-five degrees to thirty-one degrees to thirty-six degrees on the subsequent tray, to forty degrees, forty-five degrees on a next tray, etc. the increase in angle of the scoop 26 of the spinning tray 22 accommodates increases in pressure of the water vapor which builds up as the water vapor passes through the vessel 12. The increase in angle can also be used to further agitate and create water vapor, and increase the pressure of the water vapor, which may be used in a steam turbine, as will be more fully described herein.

Figure 7:
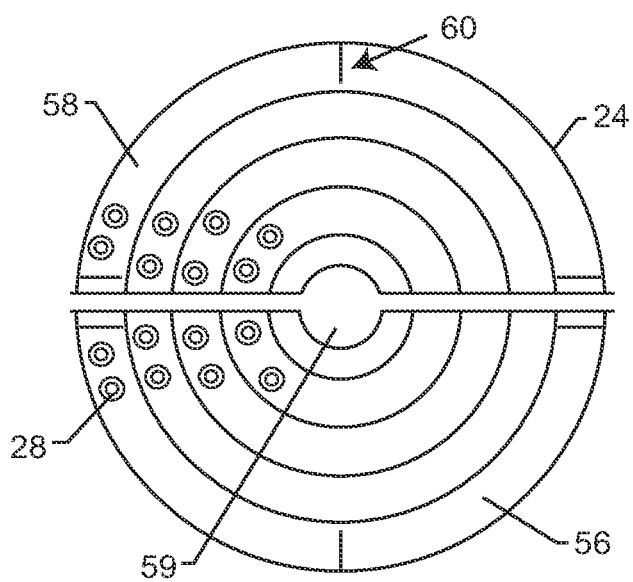
FIG. 7 is a top view of a baffle, used in accordance with the present invention.
Figure 9:
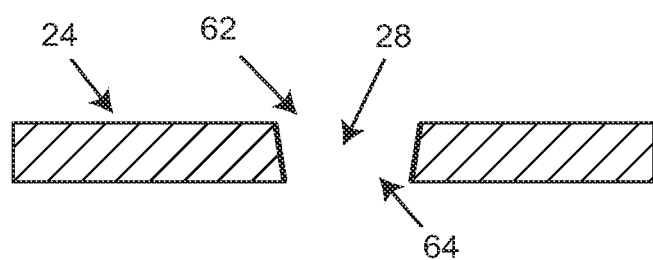
FIG. 9 is a cross-sectional view of a portion of the baffle, illustrating a tapered aperture thereof.

With reference now to FIGS. 7 and 9, a baffle 24, in the form of an apertured plate, is shown in FIG. 7. In this case, the baffle 24 is formed as a first plate member 56 and a second plate member 58 which are connected by connectors 60 to the inner wall of the vessel 12. The connectors 60 can comprise bolts, dowels, rods, or any other connecting means which is adequate. Alternatively, as described above, the baffle 24 can be formed as a single unit connected to either the upper or the lower vessel shell 12a and 12b. When formed as dual plate members 56 and 58, preferably the plate members 56 and 58 inter-engage with one another when the vessel 12 is closed so as to effectively form a single baffle 24.

As described above, a plurality of apertures 28 are formed through the baffle plate 24. FIG. 9 is a cross-sectional view of one such aperture 28. Similar to the tray described above, the aperture preferably includes an inlet 62 having a diameter which is greater than an outlet 64 thereof, such that the aperture 28 is tapered which will increase the pressure and velocity of the water and water vapor which passes therethrough, further increasing the temperature and creating additional vapor from the water. Similar to the tray 22 described above, apertures 28 may be formed in the entire baffle plate, as represented by the series of dashed lines. The particular number and size of the apertures 28 may vary depending upon the operating conditions of the system 10.

Figure 8:
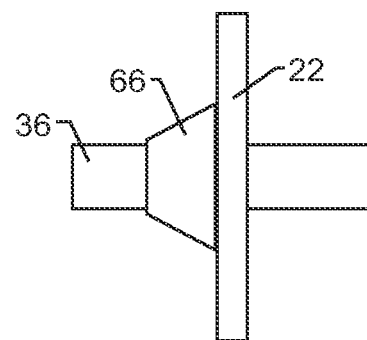
FIG. 8 is a side view of a tray having a water director placed in front thereof.

With reference now to FIG. 8, the shaft 36 is illustrated extending through the rotating tray 22. In one embodiment, a cone-shaped water director 66 is positioned in front of the tray 22. For example, the director 66 may have a forty-five degree angle to deflect the remaining water and vapor passing through the central opening 59 of the baffle 24 from the shaft 36 and towards the periphery or outer edge of the tray 22 for improved vaporization and higher percentage recovery of potable water.

Referring again to FIGS. 3 and 4, as mentioned above, in a particularly preferred embodiment the vessel 12 may be formed into two shells or sections 12a and 12b. This enables rapid inspection and replacement of vessel components, as necessary. Preferably, the wall of the inner chamber 14 and any other components such as the trays 22, baffle plates 24, shaft 36, etc. are treated with Melonite, or other friction reducing and corrosion resistant substance. Of course, these components can be comprised of materials which are corrosion resistant and have a low friction coefficient, such as polished stainless steel or the like. The lower and upper sections 12a and 12b of the vessel 12 are preferably interconnected such that when closed they are substantially air and water tight. Moreover, the closed vessel 12 needs to be able to withstand high temperatures and pressures due to the water vaporization therein during operation of the system 10.

Figure 10:
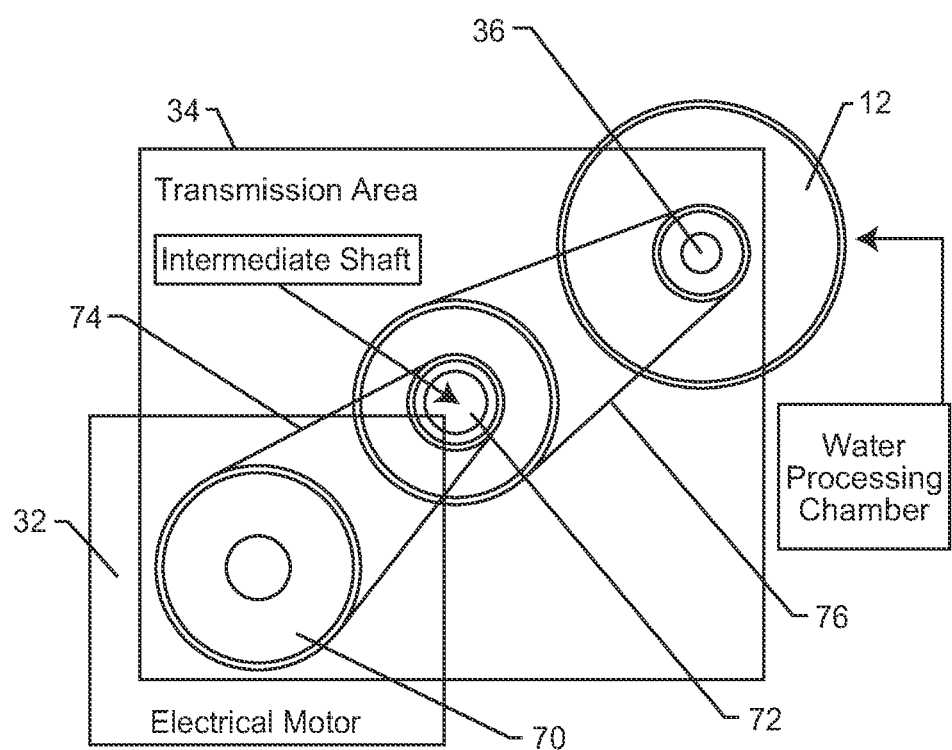
FIG. 10 is a schematic illustrating the electric motor coupled to the transmission and then coupled to the shaft of the water processing vessel, in accordance with the present invention.

With reference now to FIGS. 1, 2 and 10, typically a transmission 34 interconnects the electric motor 32 and the drive shaft 36. The motor 32 may be a combustion engine (gasoline, diesel, natural gas, etc.), electric motor, gas turbine, or other known means for providing drive. The speed of the transmission 34 is set by the variable frequency drive 30. The illustrations in FIGS. 1, 2 and 10 are only schematic and not representative of the relative sizes of the variable frequency drive 30, the motor 32m and the transmission 34. The variable frequency drive 30 is primarily regulated by a computerized controller 68, as will be more fully described herein. The shaft 36 may be belt or gear driven. As described below, the motor 32 may also be directly connected to the shaft 36. With particular reference to FIG. 10, the shaft 70 of the motor is connected to an intermediate shaft 72 by a belt 74. The intermediate shaft 72 is connected to the shaft by another belt 76. The high-speed industrial belt and pulley system shown in FIG. 10 drives the shaft 36 inside the water processing vessel 12. As shown, a plurality of belts 74 and 76 and a set of intermediate shafts 72 increase the rotational output speed at the shaft 36 by a multiple of the rotational input speed applied by the electric motor 32 on the electric motor driveshaft 70. Of course, the ratio of rotational input speed to rotational output speed can be changed by changing the relative rotational velocities of the belts 74 and 76 and corresponding intermediate shafts 72. By coupling the electric motor driveshaft 70 to the shaft 36 via belts 74 and 76 and intermediate shaft 72, and adding a Schmitt coupler on the shaft 36 between the transmission 34 and the chamber 12, the present invention is able to avoid the vibrational and reliability problems that plague other prior art desalinization systems.

With reference again to FIG. 1, as mentioned above, the water vapor is directed through a water vapor outlet 48 of the vessel 12. The water vapor travels through a recovery tube 78 to a vapor recovery container or tank 80. The water vapor then condenses and coalesces into liquid water within the vapor recovery tank 80. To facilitate this, in one embodiment, a plurality of spaced apart members 82, such as in the form of louvers, are positioned in the flow pathway of the water vapor such that the water vapor can coalesce and condense on the louvers and become liquid water. The liquid water is then moved to a potable water storage tank 84 or a pasteurizing and holding tank 86. If the water and water vapor in the vessel 12 is heated to the necessary temperature for pasteurization, so as to kill harmful microorganisms, zebra mussel larvae, and other harmful organisms, the liquid water may be held in holding tank 86.

Figure 15:
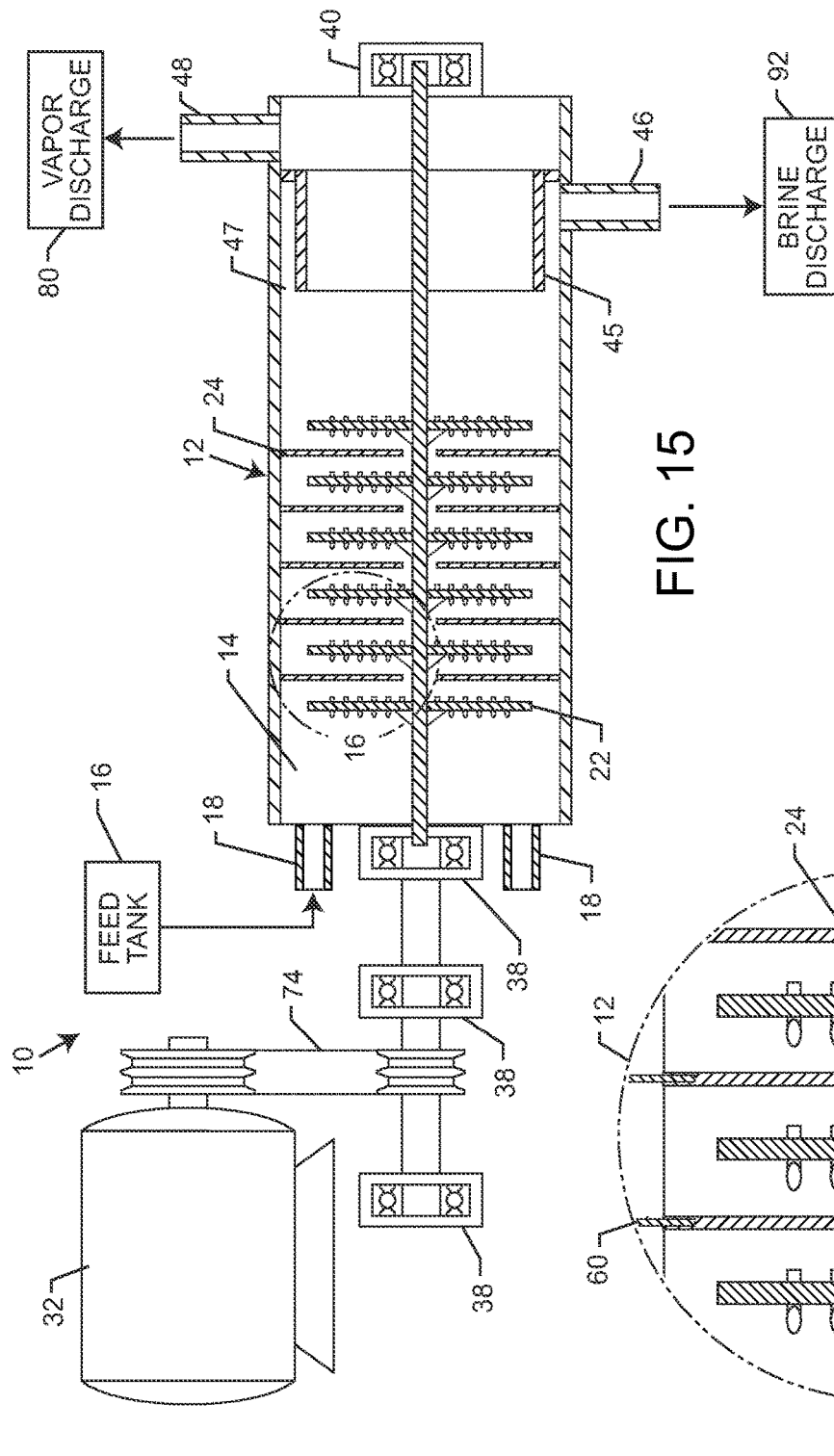
FIG. 15 is a front schematic and partially sectioned view of an alternate embodiment of a system for decontaminating water and generating water vapor, in accordance with the present invention.

With reference now to FIGS. 15-27, another preferred embodiment of the system 10 and water processing vessel 12 is shown. FIG. 15 illustrates the overall system 10 including the alternate single piece construction of the vessel 12. In this embodiment, the vessel 12 has a construction similar to the previously described embodiment, including elements such as the inner chamber 14, the inlet valve 18, the trays 22 having scoops 26, the baffles 24 having apertures 28, the brine outlet 46, and the vapor outlet 48. The inlet valve 18 comprises multiple inlets, preferably at least two, to the vessel 12. These inlets 18 are disposed on the end of the vessel around the shaft 36 so as to more evenly distribute the fluid across the inner chamber 14. The inlets 18 preferably enter the vessel 12 in-line with the shaft 36 so as to avoid a steep, especially a right angle, of entry into the inner chamber 14 relative to the direction of movement through the vessel 12. The contaminant outlet 46 is preferably oversized so as to not restrict the flow of concentrated fluid out of the system 10. The recirculating feature described below can address any excessive allowance of liquid that may be permitted to exit the system 10 through the oversized contaminant outlet 46. A shaft 36 supported by ceramic bearings 38, 40 passes through the center of the trays 22 and baffles 24.

The trays 22 are affixed to the shaft 36 and extend outward toward the wall of the inner chamber 14 as described above. The baffles 24 preferably comprise a single piece extending from the walls of the inner chamber 14 toward the shaft 36 with a central opening 59 forming a gap between the baffles 24 and the shaft 36 as described above. The baffles 24 are preferably fixed to the walls of the inner chamber by screws or dowels 60 also as described above. In a particularly preferred embodiment, the vessel 12 includes six trays 22 and five baffles 24 alternatingly dispersed through the inner chamber 14.

In this alternate embodiment, the inner chamber 14 includes an internal sleeve 45 disposed proximate to the brine outlet 46. The internal sleeve 45 has an annular shape with a diameter slightly less than the diameter of the inner chamber 14. The internal sleeve 45 extends from a point downstream of the last tray 22 to another point immediately downstream of the brine outlet 46. An annular passageway 47 is created between the internal sleeve 45 and the outer wall of the inner chamber 14. In a typical construction, the internal sleeve 45 is about six inches long and the annular passageway 47 is about 1-1½ inches wide. This annular passageway or channel 47 captures the brine or contaminate material that is spun out from the rotating trays 22 to the outer wall of the chamber 14 as described above. This annular passageway 47 facilitates movement of the brine or contaminate material to the outlet 46 and minimizes the chances of contamination of the vapor discharge or buildup of material within the chamber 14.

Figure 16:
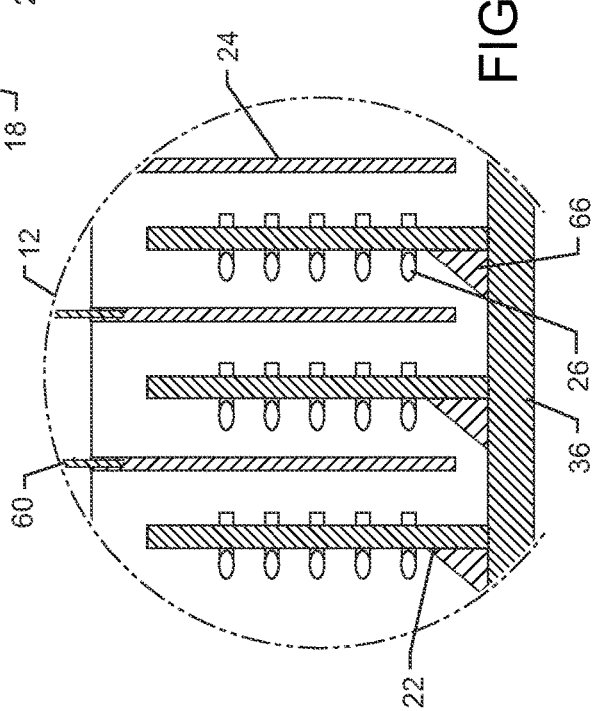
FIG. 16 is a close-up of the trays and baffles of the system of FIG. 15 indicated by circle 16.
Figure 17:
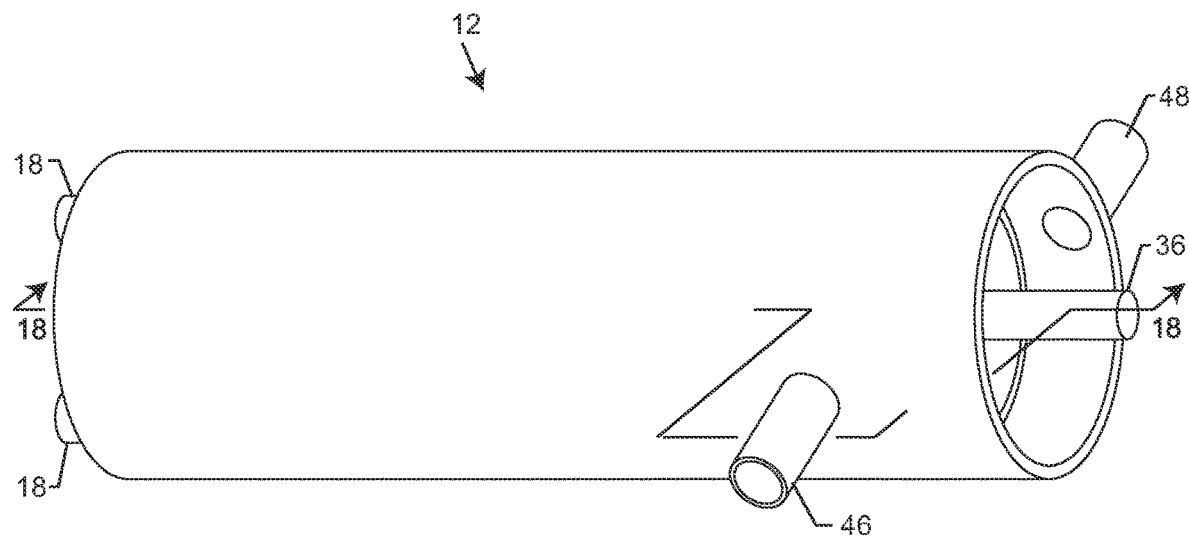
FIG. 17 is a lower perspective view of the vessel with inlet and outlets depicted in the system of FIG. 15.
Figure 18:
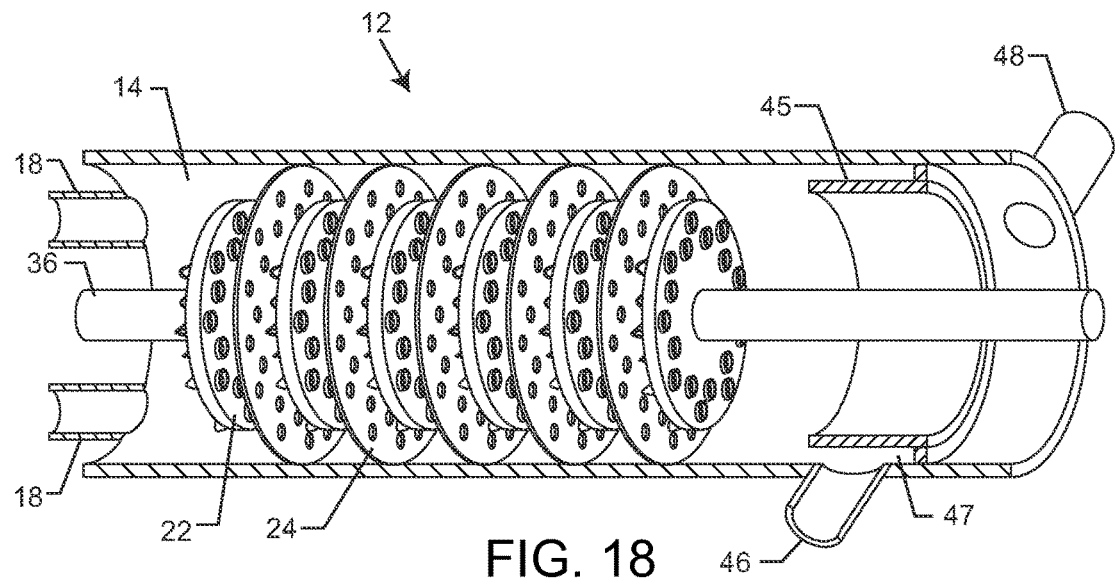
FIG. 18 is a cross-section of the vessel of FIG. 17 taken along line 18-18 thereof.
Figure 30:
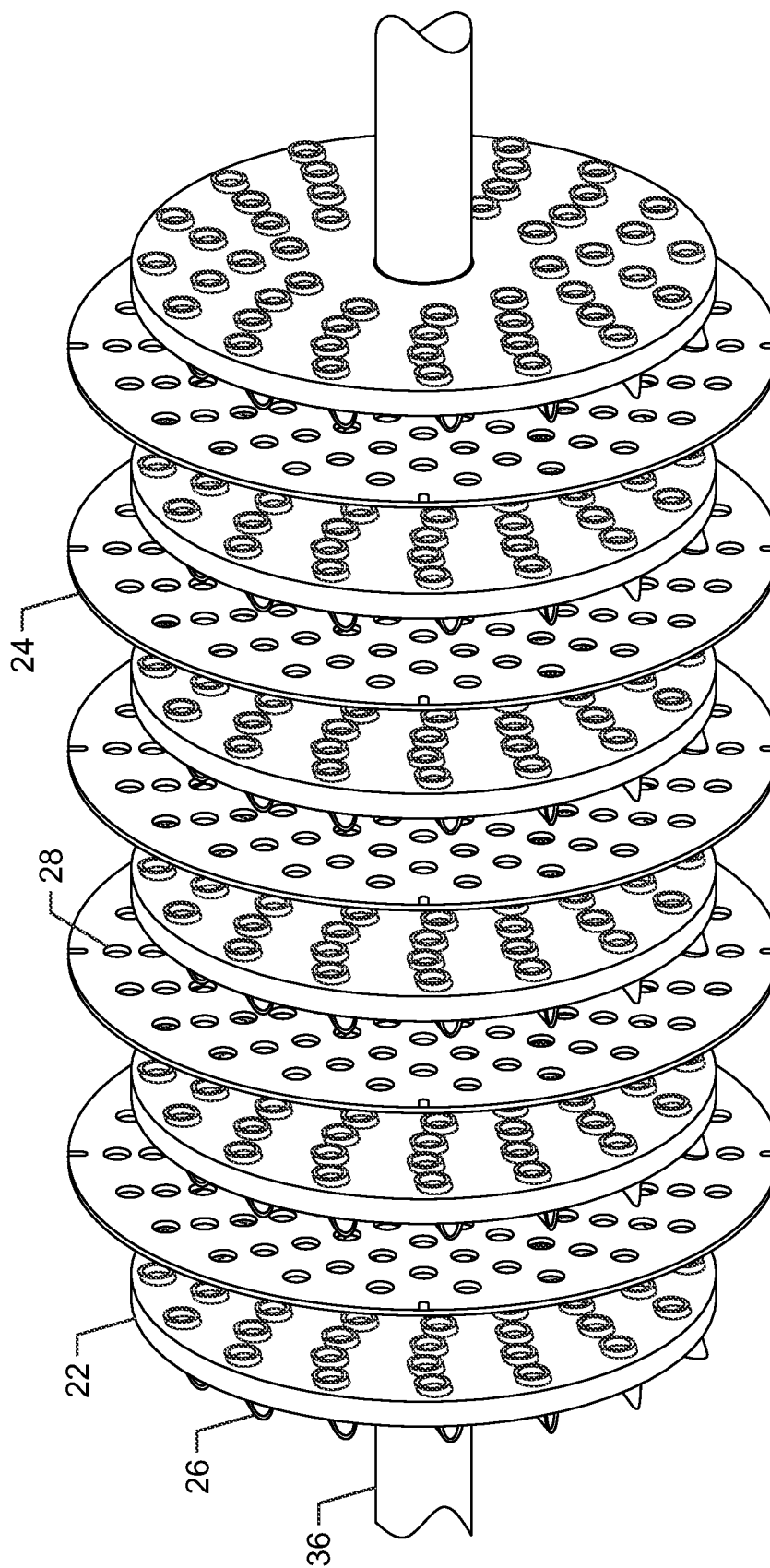
FIG. 30 is an illustration of an embodiment of the shaft with trays and baffles of the system of FIG. 15 with an increased diameter and an increase number of scoops and apertures on the trays and baffles.
Figure 31:
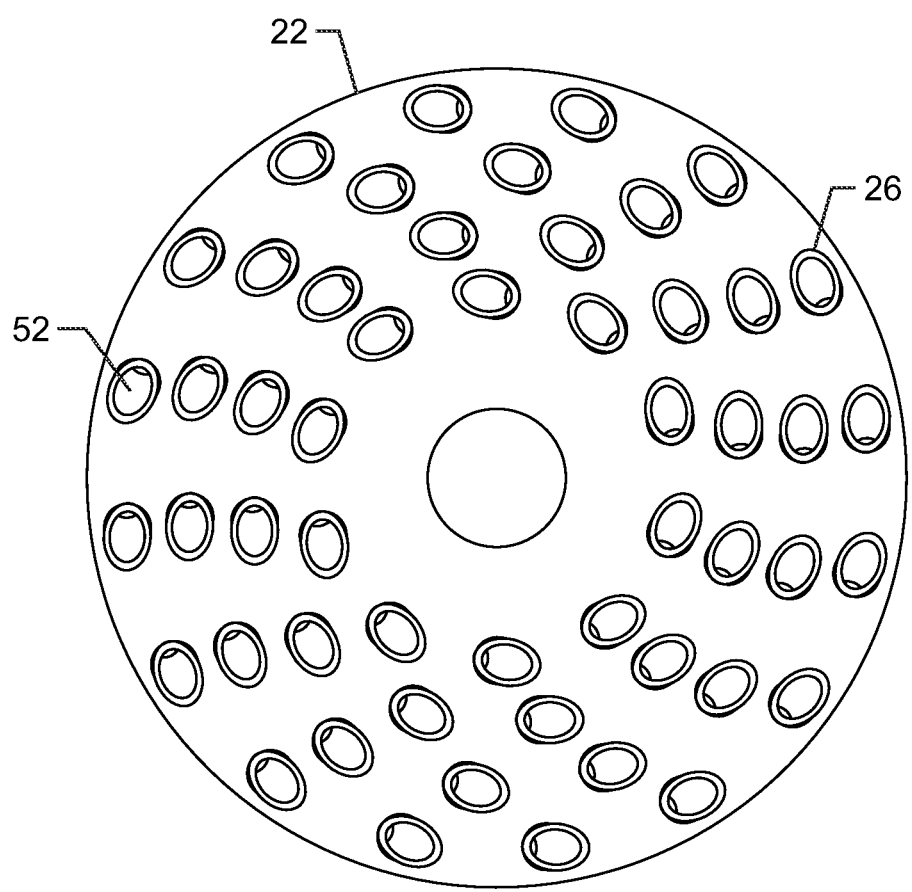
FIG. 31 is a side view of a tray excerpted from FIG. 30.
Figure 32:
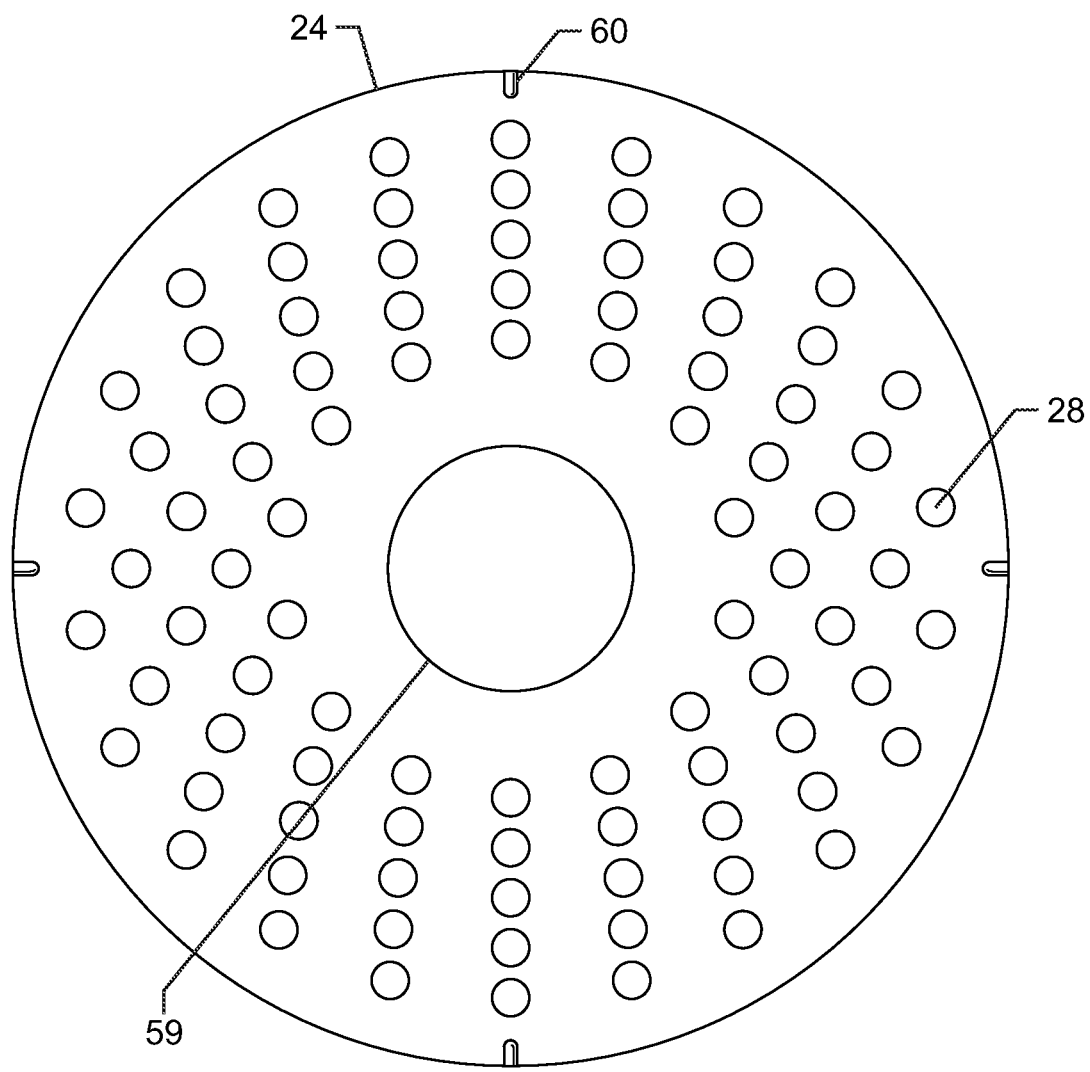
FIG. 32 is a side view of a baffle excerpted from FIG. 30.

FIG. 16 illustrates a close-up of the trays 22 and baffles 24. One can clearly see how the baffles 24 extend from the wall of the vessel 12 through the chamber 14 and end proximate to the shaft 36. One can also see how the trays 22 are affixed to the shaft 36 and have scoops 26 disposed therethrough as described. A cone 66 is preferably disposed on each tray 22 so as to deflect any fluid flowing along the shaft as described above (FIG. 8). FIG. 17 illustrates an external view of the vessel 12 indicating the inlets 18, the outlets 46, 48 and the shaft 36. Ordinarily, the ends of the vessel 12 would be enclosed and sealed against leaks. They are depicted open here for clarification and ease of illustration. FIG. 18 illustrates a cross-section of the vessel 12 shown in FIG. 17, further illustrating the internal components, including the trays 22, baffles 24, internal sleeve 45 and annular passageway 47. FIG. 19 illustrates the shaft 36 with trays 22 and baffles 24 apart from the vessel 12. FIGS. 30, 31, and 32 illustrate an alternate embodiment of the trays 22 and baffles 24 along the shaft 36. In this alternate embodiment, the trays 22 and baffles 24 are of an increased diameter with an increased number of rows—preferably 3 to 4 rows—and a corresponding increase in the number of scoops and apertures therein. These increases allow for a larger volume of fluid to be processed per unit of time. Of course, the vessel 12 will have a corresponding increase in its diameter to accommodate the larger trays 22 and baffles 24. This increased diameter creates a situation where the outermost edges of the rotating trays 22 have a significantly greater rotational velocity compared to the trays 22 of smaller diameter.

Figure 22:
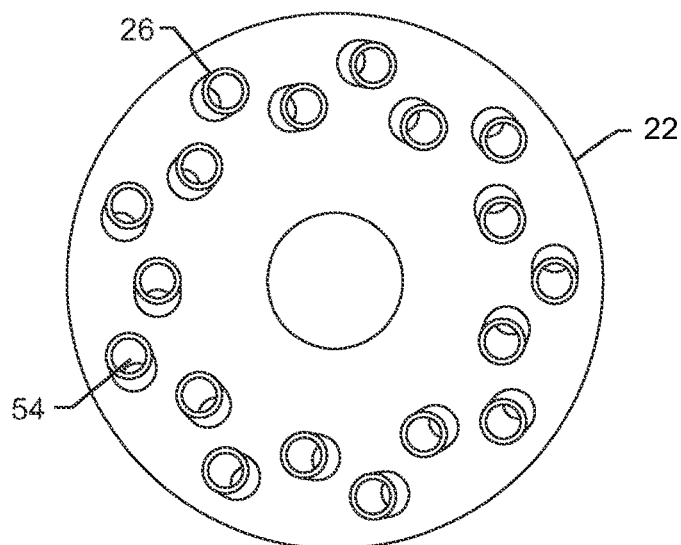
FIG. 22 is a side view of a tray indicated by line 22-22 in FIG. 20.
Figure 23:
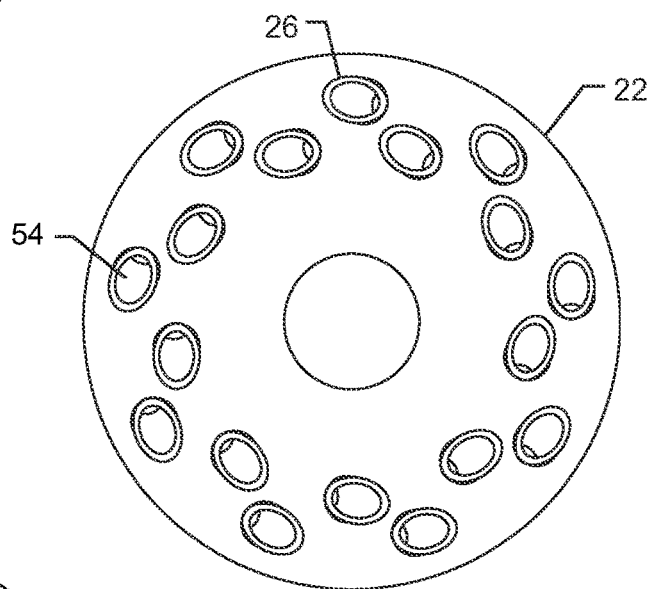
FIG. 23 is an opposite side view of the tray indicated by line 23-23 of FIG. 20.
Figure 24:
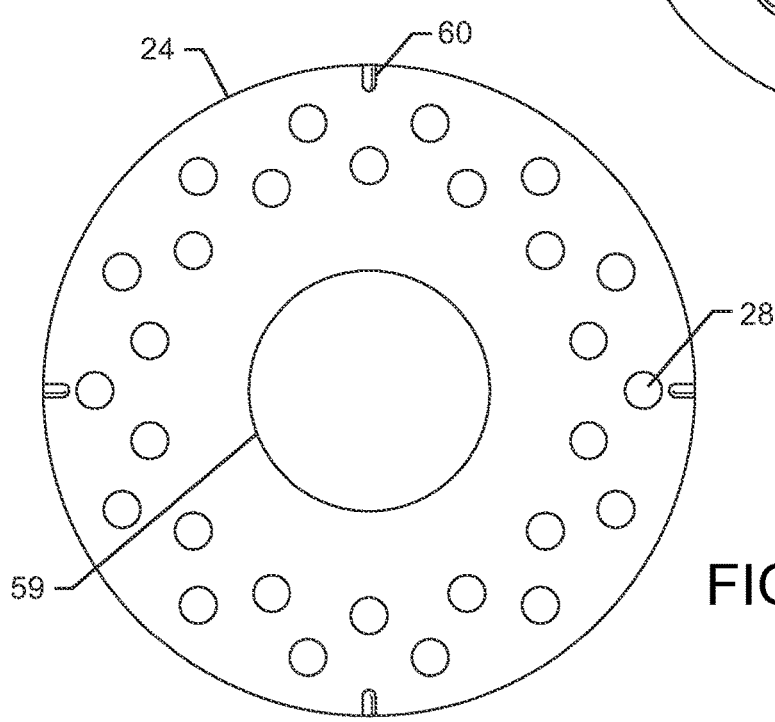
FIG. 24 is a side view of a baffle indicated by line 24-24 in FIG. 21.
Figure 25:
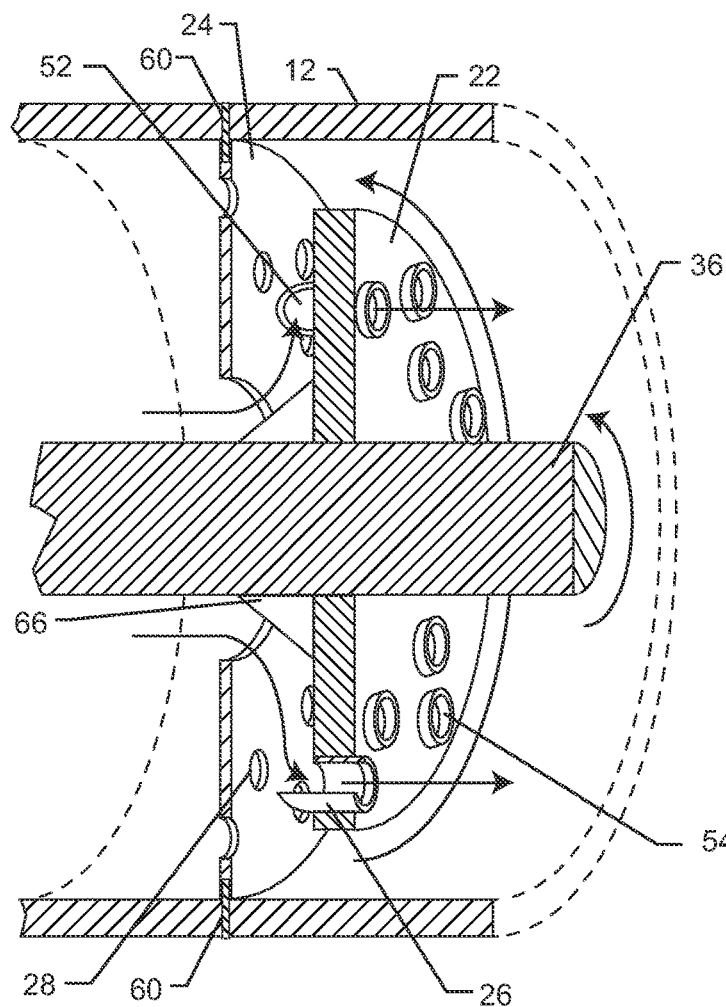
FIG. 25 is a partial cross-sectional view of the shaft, tray and baffle as disposed in the vessel.
Figure 26:
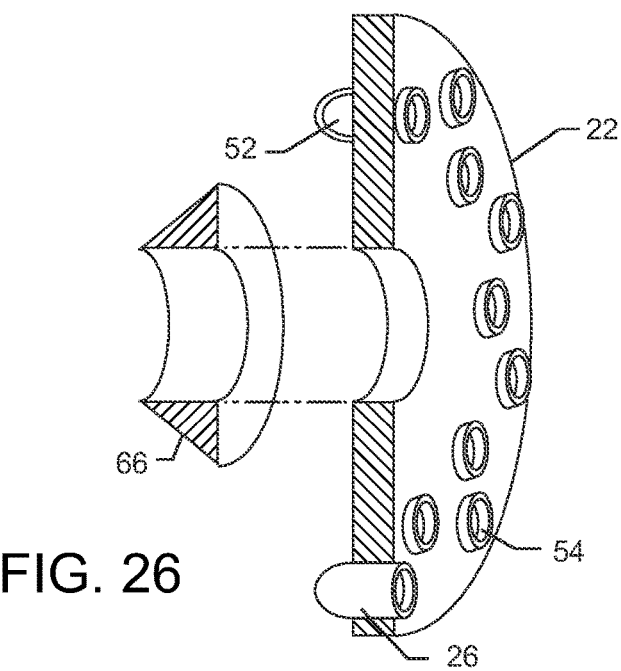
FIG. 26 is a cross-sectional view of a tray taken along line 26-26 of FIG. 20.
Figure 27:
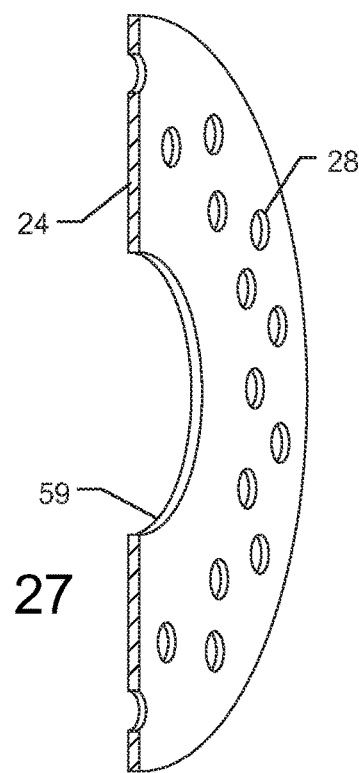
FIG. 27 is a cross-sectional view of a baffle taken along line 27-27 of FIG. 21.

FIGS. 20 and 21 illustrate the tray 22 and baffle 24, respectively. FIGS. 22, 23 and 26 illustrate various views and cross-sections of the tray 22 in FIG. 20. FIGS. 24 and 27 similarly illustrate various views and cross-sections of the baffle 24 in FIG. 21. As discussed, the tray 22 includes scoops 26 which pass through the body of the tray 22. The scoops 26 include a scoop inlet 52 and a scoop outlet 54 configured as described above. The scoop inlet 52 is preferably oriented such that the opening faces into the direction of rotation about the shaft. This maximizes the amount of fluid that enters the scoop inlet 52 and passes through the plurality of scoops. The angle of the scoops 26 on successive trays 22 may be adjusted as described above. The baffle 24 also includes a plurality of apertures 28 configured and profiled (FIG. 9) as described above. FIG. 25 illustrates the shaft 36 and a pairing of a tray 22 with a baffle 24. The arrows indicate the direction of rotation of the shaft and accordingly the tray 22 in this particular figure. The scoops 26 with the scoop inlet 52 are illustrated as facing in the direction of the rotation, i.e., out of the page, in the top half of the figure. In the bottom half of the figure, the scoop 26 with scoop inlet 52 is also illustrated as being oriented in the direction of rotation, i.e., into the page, as the tray 22 rotates with the shaft 36. The direction of rotation may be either clockwise or counter-clockwise. The direction of rotation can be changed without departing from the spirit and scope of the invention. As described in the previous embodiment, the scoop inlet 52 has a larger diameter than the scoop outlet 54 so as to increase the flow rate and decrease the fluid pressure.

In a particularly preferred embodiment, when the main goal of the system 10 is to remove contaminants from the contaminated water, such as salt water, so as to have potable water, the temperature of the water vapor is heated to between one hundred degrees Fahrenheit and less than two hundred twelve degrees Fahrenheit. Even more preferably, the water vapor is heated to between one hundred forty degrees Fahrenheit and one hundred seventy degrees Fahrenheit for pasteurization purposes. However, the water vapor temperature is kept to a minimum and almost always less than two hundred twelve degrees Fahrenheit such that the water does not boil and become steam, which is more difficult to condense and coalesce from water vapor to liquid water. Increased RPMs result in increased temperatures and pressures. The RPMs can be adjusted to achieve the desired temperatures.

The water is boiled and the water vapor temperature is brought to above two hundred twelve degrees Fahrenheit preferably only in instances where steam generation is desirable for heating, electricity generating, and other purposes as will be more fully described herein. This enables the present invention to both pasteurize the water vapor and condense and coalesce the water vapor into liquid water without complex refrigeration or condensing systems, which often require additional electricity and energy.

In one embodiment, the contaminated water, referred to as brine in desalinization processes, is collected at outlet 46 and moved to a brine disposal tank 88. As shown in FIG. 1, polymers or other chemistry 90 may be added to the brine to recover trace elements, etc. Moreover, the salt from the brine may be processed and used for various purposes, including generating table salt, agricultural brine and/or fertilizer.

In one embodiment of the present invention, the treated contaminated water is reprocessed by recycling the contaminants and remaining water through the system again. This may be done multiple times such that the amount of potable water extracted from the contaminated water increases, up to as much as ninety-nine percent. This may be done by directing the contaminants and waste water from the outlet 46 to a first brine, or contaminant, reprocessing tank 92. The remaining waste water, in the form of brine or other contaminants, is then reintroduced through inlet 18 of the vessel 12 and reprocessed and recirculated through the vessel 12, as described above. Additional potable water will be extracted in the form of water vapor for condensing and collection in the vapor recovery tank 80. The remaining contaminants and wastewater are then directed to a second brine or contaminant reprocessing tank 94. The concentration of contaminants or brine will be much higher in the reprocessing tank 92. Once a sufficient level of wastewater or brine has been accumulated in the reprocessing tank 92, this contaminated water is then passed through the inlet 18 and circulated and processed through the system 10, as described above. Extracted potable water vapor is removed at outlet 48 and turned into liquid water in the vapor recovery tank 80, as described above. The resulting contaminants and wastewater can then be placed into yet another reprocessing tank, or into the brine disposal tank 88. It is anticipated that an initial pass-through of seawater will yield, for example, eighty percent to ninety percent potable water. The first reprocessing will yield an additional amount of potable water, such that the total extracted potable water is between ninety percent and ninety-five percent. Passing the brine and remaining water through the system again can yield up to ninety-nine percent recovery of potable water, by recycling the brine at little to no increase in unit cost. Moreover, this reduces the volume of the brine or contaminants, which can facilitate trace element recovery and/or reduce the disposal costs thereof.

Figure 11:
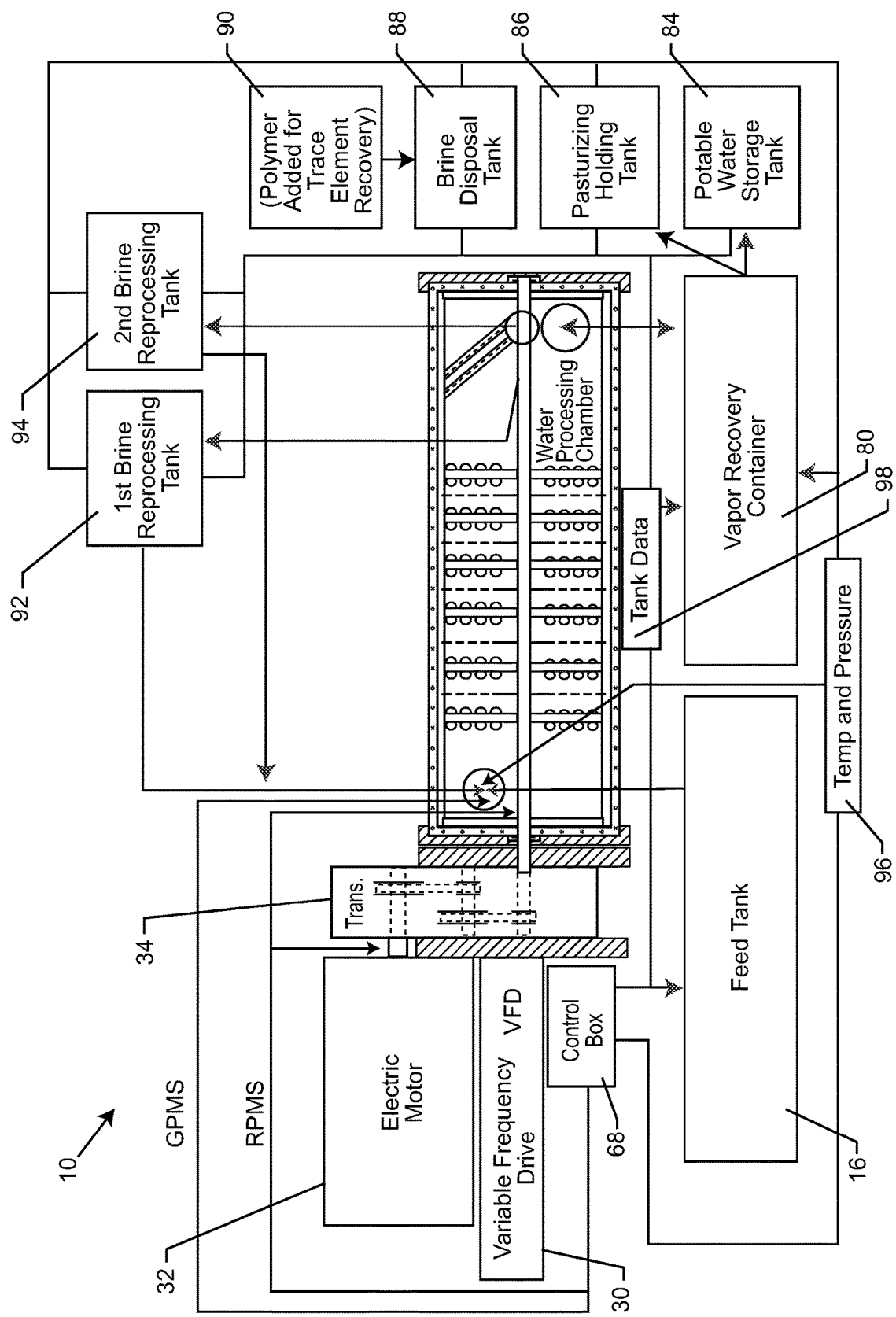
FIG. 11 is a schematic illustration of the system of the present invention, similar to FIG. 1, but illustrating the incorporation of a control box and various sensors, in accordance with the present invention.

With reference now to FIG. 11, in a particularly preferred embodiment, a computer system is integrated into the system 10 of the present invention which regulates the variable frequency drive 30 based on measurements taken from a plurality of sensors that continually read temperature, pressure, flow rate, rotational rates of components and remaining capacity of a variety of tanks connected to the water processing vessel 12. Typically, these readings are taken in real-time.

For example, temperature and/or pressure sensors 96 may be employed to measure the temperature of the water or water vapor within or exiting the vessel 12, as well as the pressure thereof as needed. In response to these sensor readings, the control box 68 will cause the variable frequency drive 30 to maintain the rotational speed of shaft 36, decrease the rotational speed of the shaft 36, or increase the rotational speed of the shaft 36 to either maintain the temperature and pressure, reduce the temperature and pressure, or increase the pressure and temperature, respectively, of the water and water vapor. This may be done, for example, to ensure that the water vapor temperature is at the necessary pasteurization temperature so as to kill all harmful microorganisms and other organisms therein. Alternatively, or in addition to, a sensor may be used to detect the rotational speed (RPMS) of the shaft 36 and/or trays 22 to ensure that the system is operating correctly and that the system is generating the necessary water vapor at a desired temperature and/or pressure. The computerized controller may also adjust the amount of water input through inlet 18 (GPMS) so that the proper amount of water is input as to the amount of water vapor and wastewater which is removed so that the system 10 operates efficiently. The control box 68 may adjust the flow rate of water into the vessel 12, or even adjust the water input.

Figure 28:
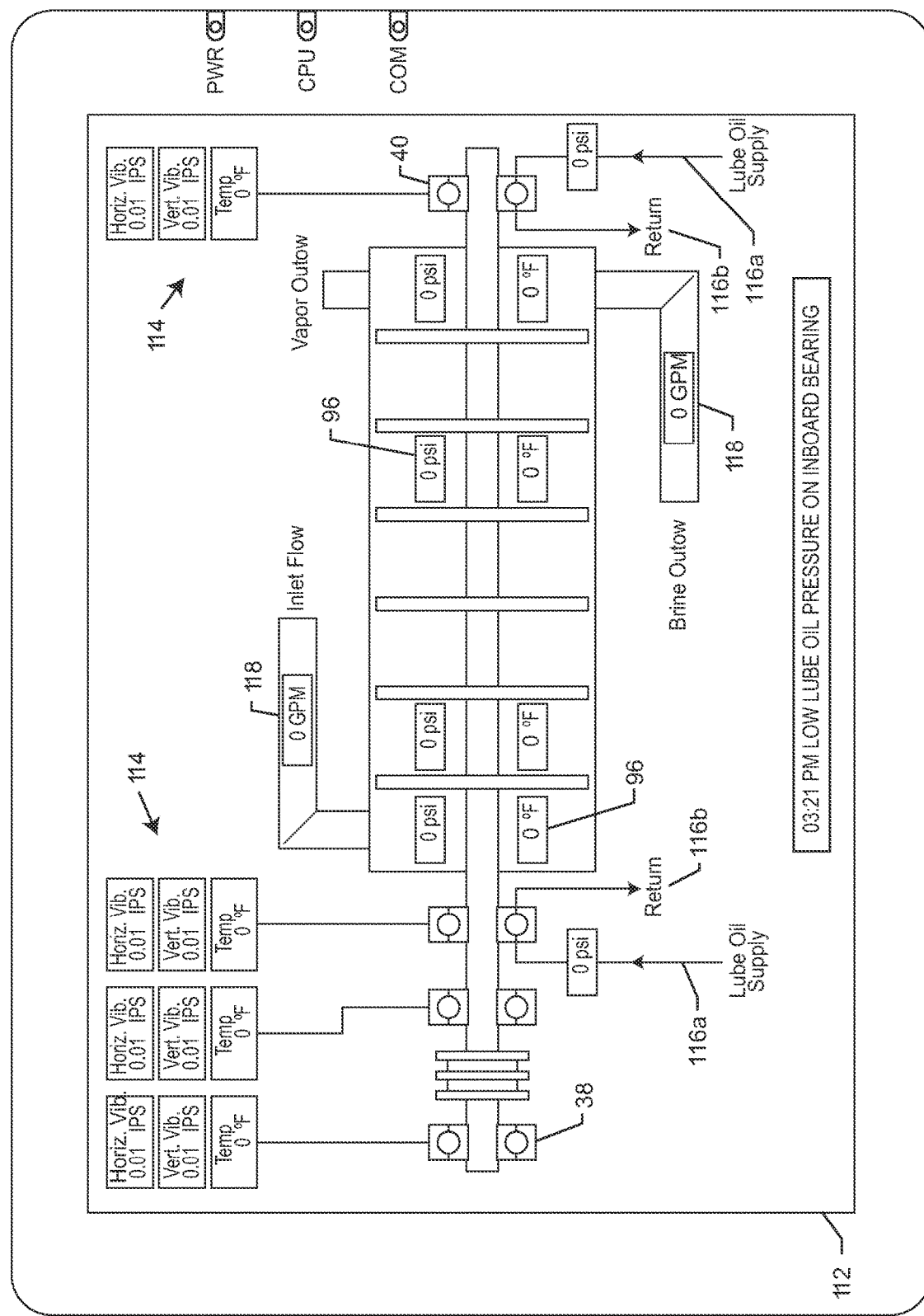
FIG. 28 is a schematic diagram of a control screen for a system of the present invention.

FIG. 28 illustrates schematically a computer display 112 or similar configuration. This computer display schematically illustrates the vessel 12 with the various inlets and outlets 18, 46, 48, as well as the shaft 36 and the plurality of trays 22. The shaft 36 has multiple vibration and temperature sensors 114 disposed along its length. The bearings 38, 40 also include vibration and temperature sensors 114. The vibration and temperature sensors 114 are configured to detect horizontal and vertical vibrations at each point, as well as the temperature of the shaft 36 generated by the friction of rotation. The bearings 38, 40 include oil supply 116a and return 116b lines to provide lubrication thereof. The inlets 18 and brine outlet 46 include flow meters 118 to detect the corresponding flow rates. Temperature and pressure sensors 96 are disposed throughout the vessel 12. The temperature and pressure sensors 96 are also disposed throughout the vessel 12 to take measurements at various predetermined points.

As indicated above, the contaminated water may come from a feed tank 16, or can be from any other number of tanks, including reprocessing tanks 92 and 94. It is also contemplated that the collected water storage tank could be fluidly coupled to the inlet 18 so as to ensure that the water is purified to a certain level or for other purposes, such as when generating steam which requires a higher purity of water than the contaminated water may provide. As such, one or more sensors 98 may track the data within the tanks to determine water or wastewater/brine levels, concentrations, or flow rates into the tanks or out of the tanks. The controller 68 may be used to switch the input and output of the tanks, such as when the brine is being reprocessed from a first brine reprocessing tank 92 to the second brine reprocessing tank 94, and eventually to the brine disposal tank 88, as described above. Thus, when the first brine reprocessing tank reaches a predetermined level, fluid flow from the feed tank 16 is shut off, and instead fluid is provided from the first brine reprocessing tank 92 into the vessel 12. The treated contaminants and remaining wastewater are then directed into the second brine reprocessing tank 94, until it reaches a predetermined level. Then the water is directed from the second brine reprocessing tank 94 through the system and water processing vessel 12 to, for example, the brine disposal tank 88. Brine water in the first reprocessing tank 92 may be approximately twenty percent of the contaminated water, including most of the total dissolved solids. The residual brine which is finally directed to the brine disposal tank 88 may only comprise one percent of the contaminated water initially introduced into the decontamination system 10 via the feed tank 16. Thus, the temperature and pressure sensors, RPM and flow meters can be used to control the desired water output including water vapor temperature controls that result in pasteurized water.

The controller 68 can be used to direct the variable frequency drive 30 to power the motor 32 such that the shaft 36 is rotated at a sufficiently high velocity that the rotation of the trays boils the input water and creates steam of a desired temperature and pressure, as illustrated in FIG. 12. FIG. 12 illustrates a steam turbine 100 integrated into the system 10. The steam turbine 100 may also be used with the vessel depicted in FIGS. 15-27. Water vapor in the form of steam could be generated in the water processing vessel 12 to drive a high pressure, low temperature steam turbine by feeding the vapor outlet 48 into an inlet on the turbine 100. The turbine 100 is in turn coupled to an electric generator 102, for cost-effective and economical generation of electricity. As shown in FIG. 12A, the steam turbine 100 may be eliminated with the shaft 36 of the vessel 12 extended to turn the generator 102 directly or indirectly. In this case, the later stages of the trays and baffles inside the vessel 12 act as a steam turbine due to the presence of the water vapor which aids the rotation of the shaft.

Figure 13:
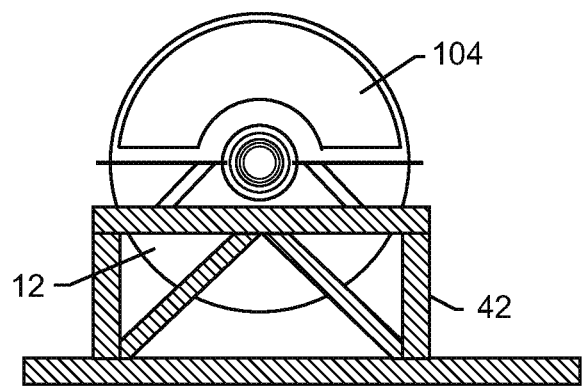
FIG. 13 is an end view of the water processing vessel, illustrating a vapor outlet thereof.
Figure 14:
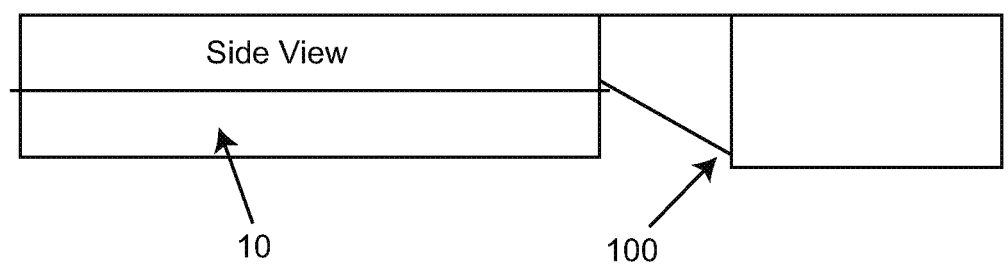
FIG. 14 is a side schematic view of the system of FIG. 12.

In the case of a steam turbine, the water vapor can be heated to in excess of six hundred degrees Fahrenheit and pressurized in excess of sixteen hundred pounds per square inch (psi), which is adequate to drive the steam turbine 100. Aside from the increased velocity of the trays, the incorporation of the tapered nature of the scoops 26 of the trays 22, and the tapered nature of the apertures 28 of the aperture plate baffles 24 also facilitate the generation of water vapor and steam. Increasing the angles of the scoops 26, such as from twenty-five degrees at a first tray to forty-five degrees at a last tray, also increases water vapor generation in the form of steam and increases the pressure thereof so as to be able to drive the steam turbine 100. FIGS. 13 and 14 illustrate an embodiment wherein a steam outlet 104 is formed at an end of the vessel 12 and the steam turbine 100 is directly connected thereto such that the pressurized steam passes through the turbine 100 so as to rotate the blades 106 and shaft 108 thereof so as to generate electricity via the electric generator coupled thereto. A water vapor outlet 110 conveys the water vapor to a vapor recovery container 80 or the like. The recovery tank 80 may need to include additional piping, condensers, refrigeration, etc. so as to cool the steam or high temperature water vapor so as to condense it into liquid water.

Of course, it will be appreciated by those skilled in the art that the steam generated by the system 10 can be used for other purposes, such as heating purposes, removal of oil from oil wells and tar and shale pits and the like, etc.

It will also be appreciated that the present invention, by means of the sensors and controller 68 can generate water vapor of a lower temperature and/or pressure for potable water production, which water vapor is directed through outlet 48 directly into a vapor recovery container, and the system sped up to create high temperature water vapor or steam for passage through the steam turbine 100 to generate electricity as needed. For example, during the nighttime hours, the system 10 may be used to generate potable water when very little electricity is needed. However, during the daylight hours, the system 10 can be adjusted to generate steam and electricity.

As described above, many of the components of the present invention, including the variable frequency drive 30, electric motor 32, transmission 34, and water processing vessel 12 and the components therein can be attached to a framework 42 which is portable. The entire system 10 of the present invention can be designed to fit into a forty foot long ISO container. This container can be insulated with a refrigeration (HVAC) unit for controlled operating environment and shipping and storage. The various tanks, including the feed tank, vapor recovery tank, portable water storage tank, and contaminant/brine reprocessing or disposal tanks can either be fit into the transportable container, or transported separately and connected to the inlet and outlet ports as needed. Thus, the entire system 10 of the present invention can be easily transported in an ISO container, or the like, via ship, semi-tractor trailer, or the like. Thus, the system 10 of the present invention can be taken to where needed to address natural disasters, military operations, etc., even at remote locations. Such an arrangement results in a high level of mobility and rapid deployment and startup of the system 10 of the present invention.

Figure 29:
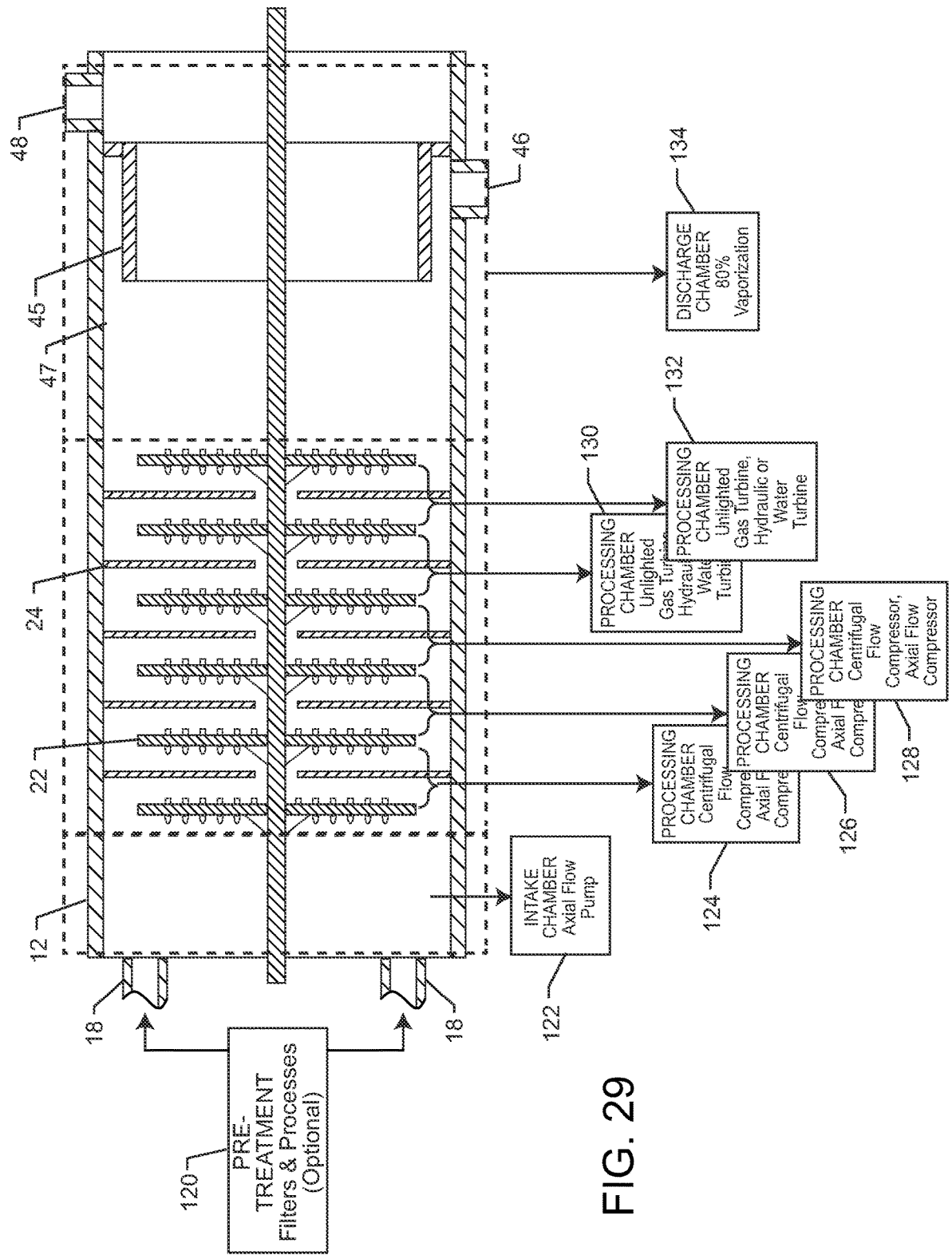
FIG. 29 is a schematic illustration of the processes occurring at various points throughout the water processing vessel of the present invention.

FIG. 29 schematically illustrates the processes occurring at various points, i.e., sub-chambers, throughout the vessel 12. The inner chamber 14 of the vessel 12 is effectively divided into a series of sub-chambers as illustrated. The vessel 12 contains five sub-chambers that perform the functions of an axial flow pump, an axial flow compressor, a centrifugal flow compressor, an unlighted gas turbine and/or a hydraulic/water turbine. In operation, the system 10 has the capability to vaporize the water through a mechanical process, thereby enabling efficient and effective desalination, decontamination and vaporization of a variety of impaired fluids. Before entering the vessel 12, the fluid may be subject to a pretreatment step 120 wherein the fluid is passed through filters and various other processes to separate contaminants that are more easily removed or that may damage or degrade the integrity of the system 10. Upon passing through the inlets 18, the fluid enters an intake chamber 122 which has an effect on the fluid similar to an axial flow pump once the system 10 reaches its operating rotation speed. An external initiating pump (not shown) may be shut off such that the system 10 draws the contaminated water through the inlet, i.e., the intake chamber functions as an axial flow pump, without the continued operation of the initiating pump. A significant reduction in intake chamber pressure causes vacuum distillation or vaporization to occur at temperatures below 212° F. Following the intake chamber 122, the fluid encounters the first tray 22 where it enters the first processing chamber 124. This first processing chamber acts as both a centrifugal flow compressor and as an axial flow compressor through the combined action of the rotating tray 22 and the adjacent baffle 24. A high percentage of the intake water is vaporized through cavitation upon impact with the high speed rotating tray 22 in the first processing chamber 124. A centrifugal flow compression process occurs within the first processing chamber 124 and each subsequent processing chamber. The centrifugal flow compression process casts the non-vaporized dissolved solids and at least some of the liquid water to the outer wall of the processing chamber 124. This action separates the dissolved solids and most of the remaining liquid from the vapor. An axial flow compression process also occurs within the first processing chamber 124 and each subsequent chamber. This axial flow compression process compresses the vapor and liquid which also increases the pressure and temperature within the processing chamber. The second processing chamber 126 and the third processing chamber 128 both function similarly by compounding the action of the centrifugal flow compressor and axial flow compressor features of the first processing chamber 124.

By the time the fluid reaches the fourth processing chamber 130 it has been subjected to centrifugal flow and axial flow compression processes such that the nature of the fluid and its flow through the vessel 12 has changed. In the fourth processing chamber the fluid behaves as if it is passing through an unlighted gas turbine or an hydraulic/water turbine by causing rotation of the shaft 36. The fifth processing chamber 132 compounds this unlighted gas turbine or hydraulic/water turbine process. The turbine processes of the fourth and fifth processing chambers 130, 132 supply a measure of force to drive rotation of the shaft 36 such that power on the motor 32 may be throttled back without a loss of functionality in the system 10. After exiting the fifth processing chamber 132 the fluid has been separated to a high degree such that nearly all of the contaminants in the form of brine pass through the annular passageway 47 to the outlet 46 and the purified vapor passes through the central portion of the inner chamber 14 to the vapor outlet 48. The turbine operations of the fourth and fifth processing chambers 130, 132 allow for continued operation of the system 10 with a reduced energy input (by as much as 25%) as compared to a startup phase once an equilibrium in the operation is reached.

After the fifth processing chamber 132, the system includes a discharge chamber. The discharge chamber 134, which is larger than any of the preceding processing chambers, contains the two discharge outlets 46, 48. The large increase in volume results in a dramatic reduction in pressure and a physical separation of the dissolved solids and the remaining water from the vapor.

The dimensions of the vessel 12 are preferably configured such that the combined processing chambers, 124-132 occupy about one-half of the total length. The discharge chamber 134 occupies about one-third of the total length. The remainder of the length of the vessel, about one-sixth of the total length, is occupied by the intake chamber 122. The processing chambers 124-132 are divided into approximately three-fifths compressor functionality and two-fifths turbine functionality. Once the fluid exits the last processing chamber 132, it has achieved about eighty percent vaporization as it enters the discharge chamber 134 and is directed to the respective outlets 46, 48.

Figure 33:
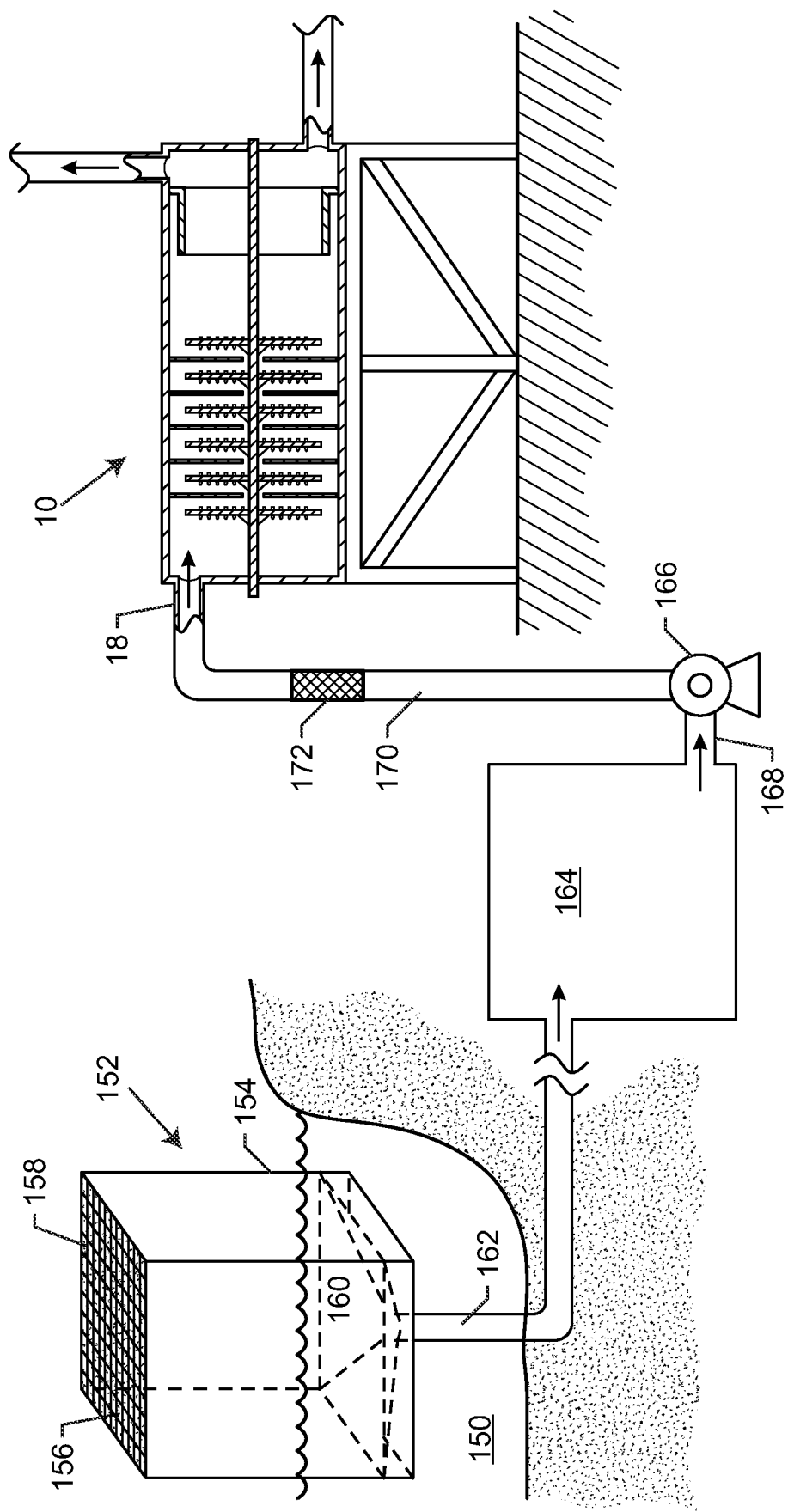
FIG. 33 is a schematic illustration of an embodiment of the system of the present invention, including a salt water capture system and storage tank.
Figure 34:
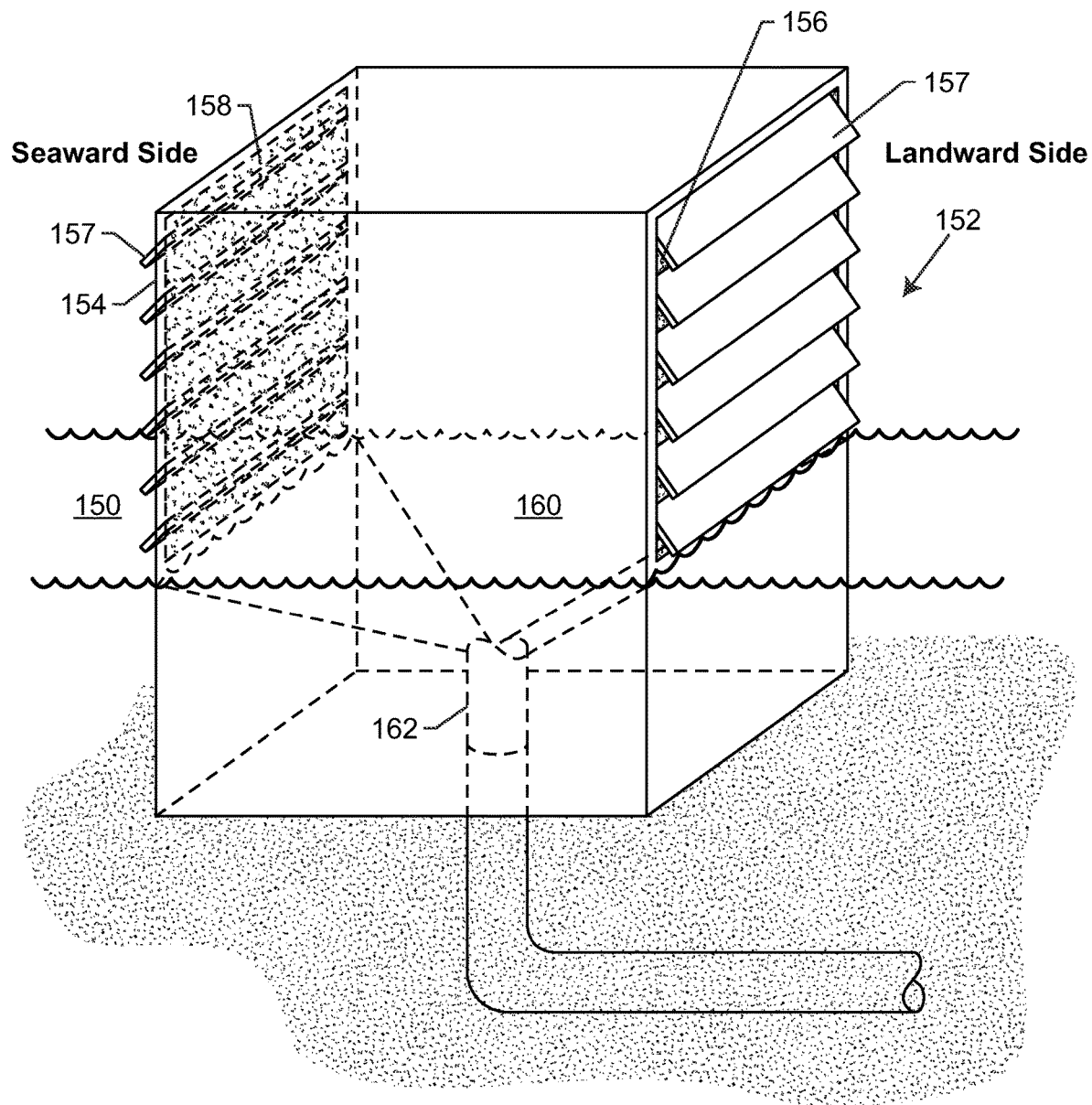
FIG. 34 is a schematic illustration of the salt water capture system of the present invention.

FIGS. 33 and 34 illustrate an embodiment of the system 10 that includes a system to capture water from a body of water 150. In this embodiment, the body of water 150 is preferably a sea or ocean containing salt water, but could be any body of water. The capture system 152 includes a capture vessel 154 that is disposed in the body of water 150 such that an open top or sides 156 of the vessel 154 are at least partially above a median water level for the body of water 150. The system 10 may function with an open top 156 on the vessel 154 as shown in FIG. 33, but the vessel preferably has open sides 156 facing the seaward and landward sides of the vessel 154 to take advantage of both the incoming and receding waves/tide. For this system to work, the water level of the body of water 150 must vary sufficiently to allow a portion of the body of water to enter the open sides 156 but not completely submerge the vessel 154. Ideally, this would occur with the rise and fall of a tide in a sea or ocean, as well as waves that may occur in such a body of water. The distance that the open sides 156 of the vessel 154 extend above the median water level depends upon the variability in the water level for a particular body of water 150. The open sides 156 are preferably covered by a filter screen 158 to reduce the occurrence of living organisms and other large objects in the body of water 150 from entering the vessel 154. The open sides 156 preferably also include pivoting louvers 157 disposed over the screens 158 that can be opened or closed so as to control the amount of water and/or sand entering the vessel 154.

Inside the vessel 154 is a capture funnel 160 or similar structure configured to direct most of the water that enters the vessel 154 into a feed pipe 162. The capture funnel 160 is preferably positioned below the median water level for the body of water. Although the vessel 154 and capture funnel 160 are illustrated as generally square shaped, they may be configured in other forms. It has been found that the square shape, with a corner thereof oriented into the a wave or tide that is preferably present in the body of water 150 facilitates the rise of the wave or tide over the vessel 154 such that water enters the open sides 156. The vessel 154 may also be configured whereby the open sides 156 angled other than vertical on a side that faces the incoming waves or tides so as to facilitate entry of water thought the open side 156. The open sides 156 are preferably disposed with most of their surface area above the median water level so that there is less likelihood of sand or other sediment being in the higher portion of the wave or tide when it reaches the open side 156.

The feed pipe 162 preferably passes to the shore and into a storage vessel 164. The system 10 may include multiple storage vessels 164 to accommodate and store a sufficient quantity of captured seawater. The feed pipe 162 may be underground as it passes to shore, but realizing that any changes in elevation to an above ground facility would require appropriate piping and pumps. The storage vessel 164 may be located near the body of water 150 or located some distance from the body of water 150 depending upon the need of the user. Once a sufficient quantity of water is stored in the vessel 164, a pump 166 attached to an outlet 168 on the vessel 164 directs the stored water through an inlet pipe 170 to the inlet 18 on the processing system 10. The inlet pipe 170 preferably includes a filtration system 172 to remove and large sediment or particles that may have made it through the storage vessel 164 and pump 166. The system 10 can then be used to desalinate the water as described elsewhere.

Figure 35:
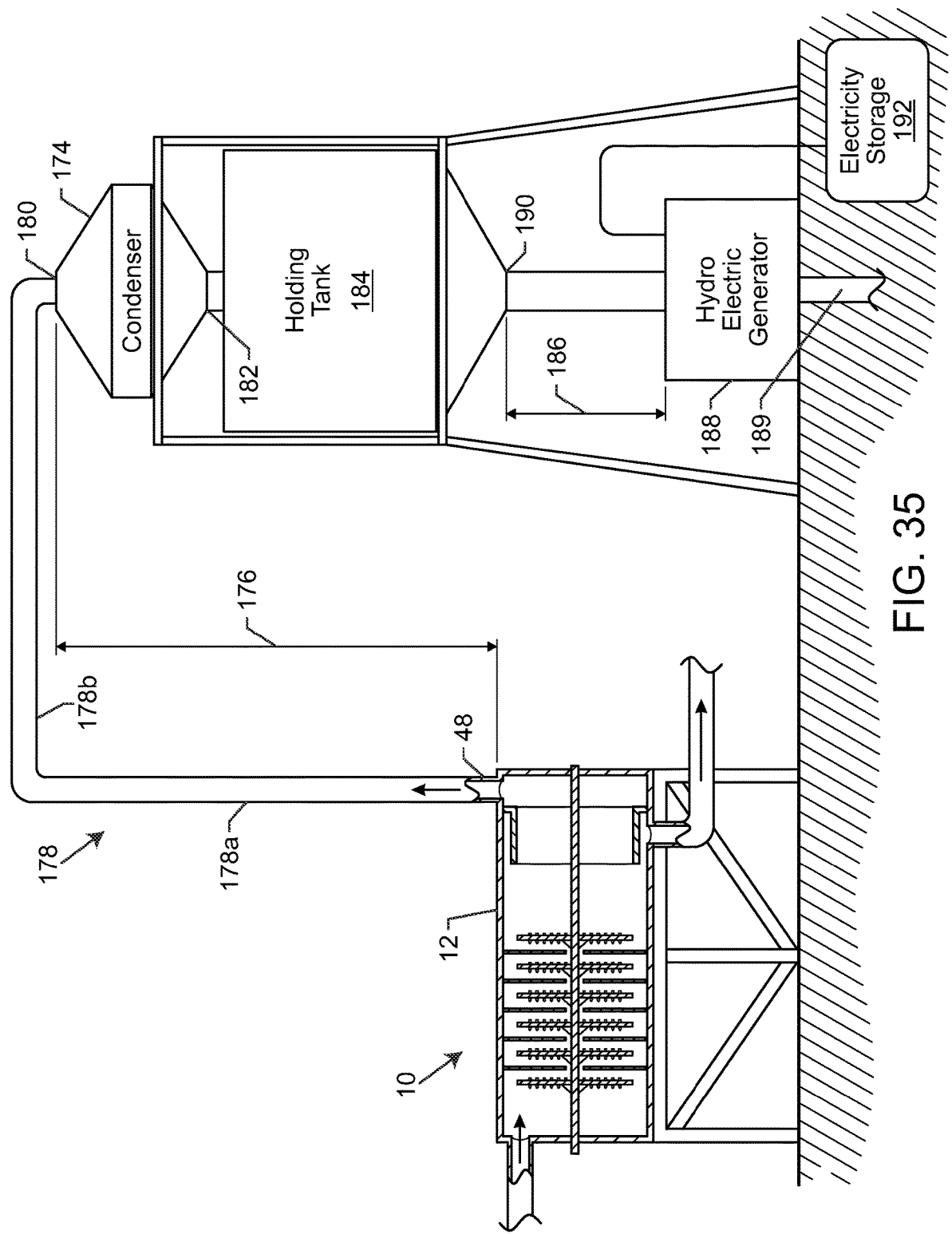
FIG. 35 is a schematic illustration of an embodiment of the system of the present invention, including an elevated condenser and holding tank with a hydro-electric generator.

FIG. 35 illustrates another embodiment of the inventive system 10, wherein the system 10 is used to generate electricity from the water vapor produced from the vapor outlet 48 as described elsewhere. In this embodiment, the system 10 further includes a condenser 174 disposed a first distance 176 above the vessel 12. A vapor pipe 178 directs the water vapor from the vapor outlet 48 to the condenser 174. Since the water vapor is lighter than air and rises under its own power, no mechanical means are necessary to raise the water vapor through the first distance 176 to the condenser 174. Preferably, the vapor pipe 178 has a generally vertical section 178a that extends at least the first distance 176, if not slightly more than the first distance 176. A generally horizontal section 178b of the vapor pipe 178 extends from the end of this vertical section 178a to an inlet 180 on the condenser 174. This generally horizontal section 178b may have a slight decline from the end of the vertical section 178a to the inlet 180 on the condenser 174. This allows for the possibility that any incidental condensing that occurs in the vapor pipe 178 runs down the slope of the generally horizontal section 178b into the condenser 174. The vapor pipe 178 and all sections thereof is preferably insulated to prevent the premature loss of heat and minimize the occurrence of condensation during the rise to the condenser.

Figure 35A:
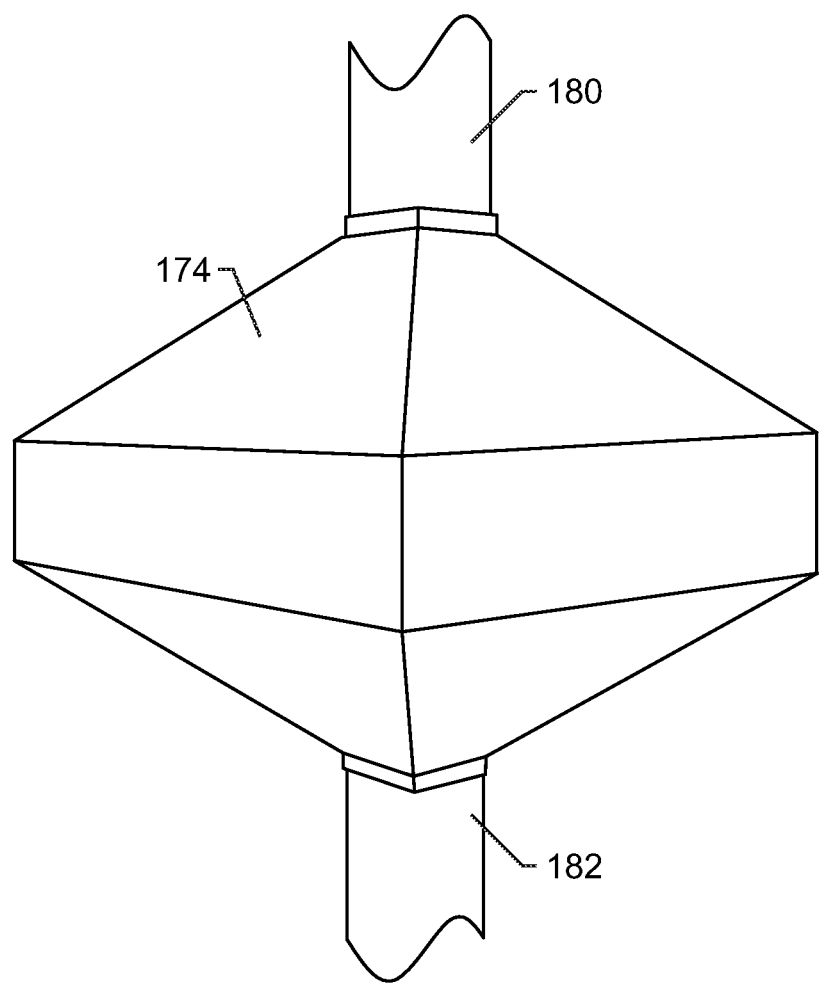
FIG. 35A is a schematic illustration of the condenser of FIG. 35.

Although FIG. 35A illustrate the condenser 174 in a particular generally diamond-shape, the condenser 174 may be constructed in other shapes as known by those skilled in the art of processing vapor or steam. The purpose of the condenser is to fully condense vapor that is produced by the system 10. The preferably includes sufficient structures inside as are known to those skilled in the art to facilitate condensation of the vapor. As the vapor condenses, it flows through an outlet 182 on the condenser 174 and into a condensate holding tank 184.

The holding tank 184 is preferably disposed a second distance 186 above a hydro-electric generator 188. Once a sufficient quantity of condensed processed fluid is stored in the holding tank 184, the condensed processed fluid is released from an outlet 190 on the holding tank 184. The condensed processed fluid falls under the force of gravity across the second distance 186 into the hydro-electric generator 188. The hydro-electric generator 188 converts the kinetic energy of the falling condensed processed fluid into electrical energy for storage or immediate use. The electrical energy may be stored in a rechargeable chemical battery, a capacitor, or similar known means of electrical storage 192. The condensed processes fluid that falls into the hydroelectric generator 188 is released through a generator outlet 189 to be used for subsequent processing (not shown), as would typically be done with such treated water.

Although the first distance 176 and the second distance 186 are depicted in FIG. 35 as apparently "stacking" one on top of the other, that is not a requirement of these distances. The only requirement on either of these distances is that the second distance 186 be sufficiently above the hydro-electric generator 188 so as to allow for the efficient conversion of kinetic energy of the falling processed fluid into electrical energy. Preferably, this second distance 186 is at least ten feet, but may be twenty feet or more, depending upon the quantity of condensed processed fluid and the capabilities of the hydro-electric generator. The first distance 176 needs to be of sufficient distance to place the condenser 174 and holding tank 184 above the second distance 186. Necessarily, the first distance 176 depends upon the sizes of the condenser 174, the holding tank 184, and the second distance 186.

Figure 36:
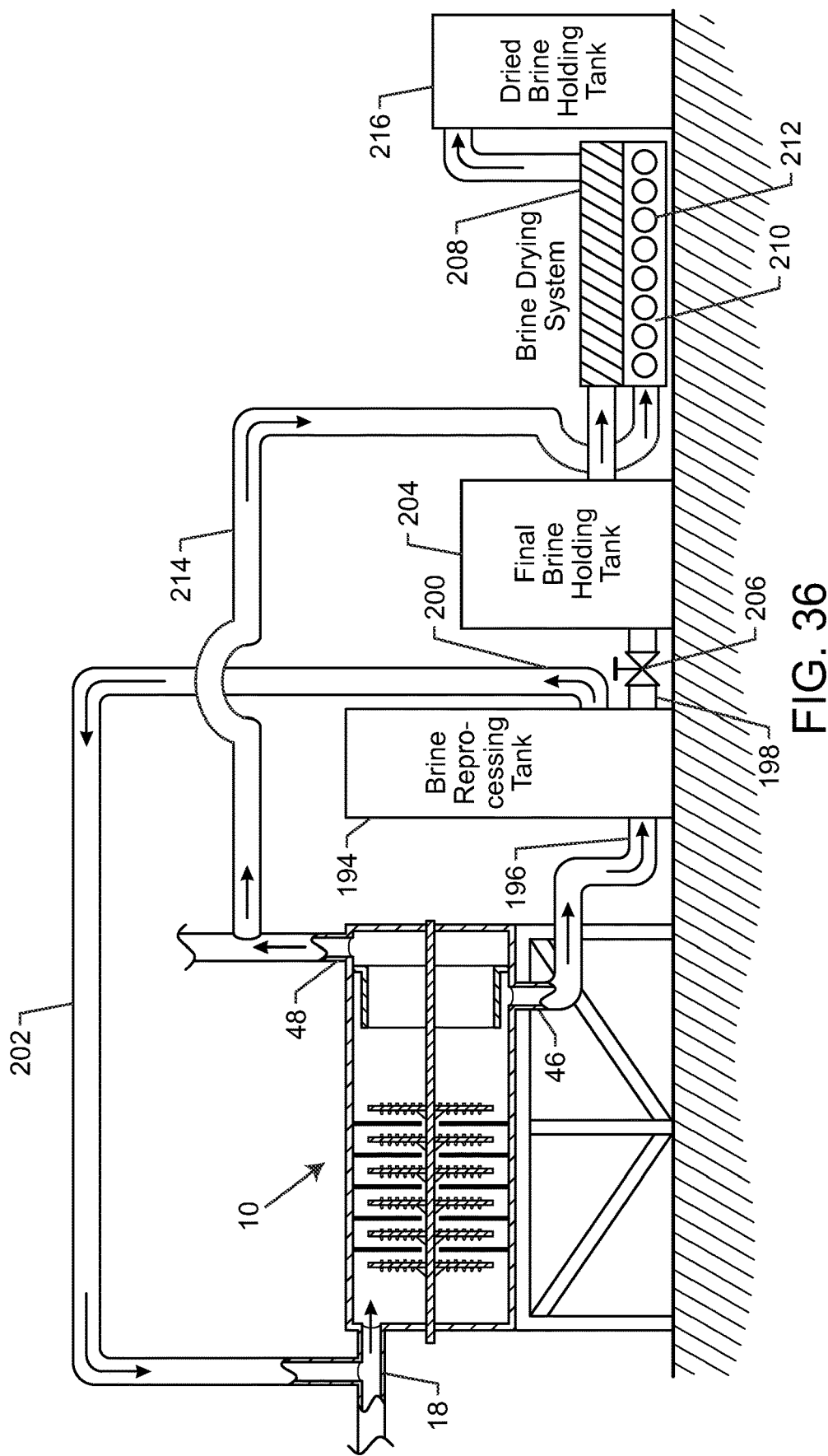
FIG. 36 is a schematic illustration of an embodiment of the system of the present invention, including a bring recirculating system and a brine drying system.

FIG. 36 illustrates another embodiment of the inventive system 10, wherein the brine outlet 46 and vapor outlet 48 are both used for further processing. Specifically, a brine reprocessing tank 194 receives the brine from the brine outlet 46 through a reprocessing inlet 196. The brine reprocessing tank 194 also includes a reprocessing outlet 198 and a recirculating outlet 200. A first portion of the brine in the brine reprocessing tank 194 is passed to the recirculating outlet 200 where it is directed by a recirculating pipe 202 back to the inlet 18 of the system 10 for re-processing. In this way, the brine is reprocessed to recover additional water vapor from the processing fluid.

A second portion of the brine in the brine reprocessing tank 194 is passed to the reprocessing outlet 198 for storage in a brine holding tank 204. This reprocessing outlet 198 may include a valve 206 for restricting or completely closing off the flow of the second portion of the brine to the brine holding tank 204. The brine holding tank 204 is connected to a brine drying system 208 which includes a heat exchanger 210 with circulating heat pipes 212. The circulating heat pipes 212 pass back and forth as is typical of heat exchangers 210. Being part of the inventive system 10, the heat exchanger 210 receives its heat source from the water vapor from the vapor outlet 48. Specifically, a vapor diverting pipe 214 extracts a portion of the water vapor from vapor out 48 and communicates to the circulating heat pipes 212 of the heat exchanger 210. The stored brine from the brine holding tank 204 passes over the heat exchanger 210 and any residual water is dried from the heat of the water vapor.

The dried brine is then transported to a dried brine holding tank 216 for subsequent use or processing. Such dried brine could be used to produce salt or other compounds found in salt water. In addition, any useful contaminants, i.e., metals, elements, or other valuable compounds, found in the water processed in the inventive system 10 may be recovered from the dried brine for resale or other subsequent processing.

Figure 37:
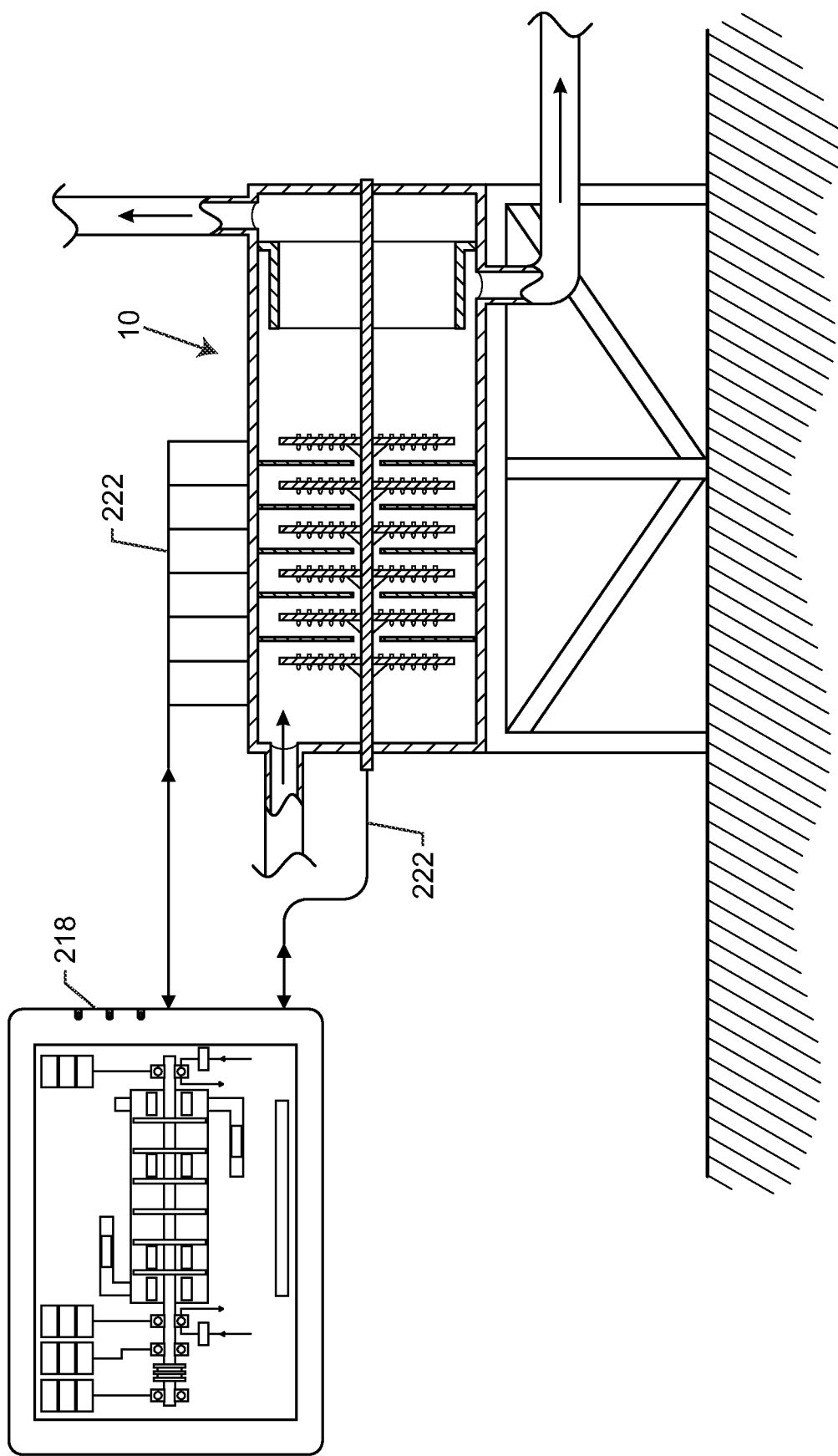
FIG. 37 is a schematic illustration of an embodiment of the system of the present invention, including a control system with a graphical display.
Figure 38:
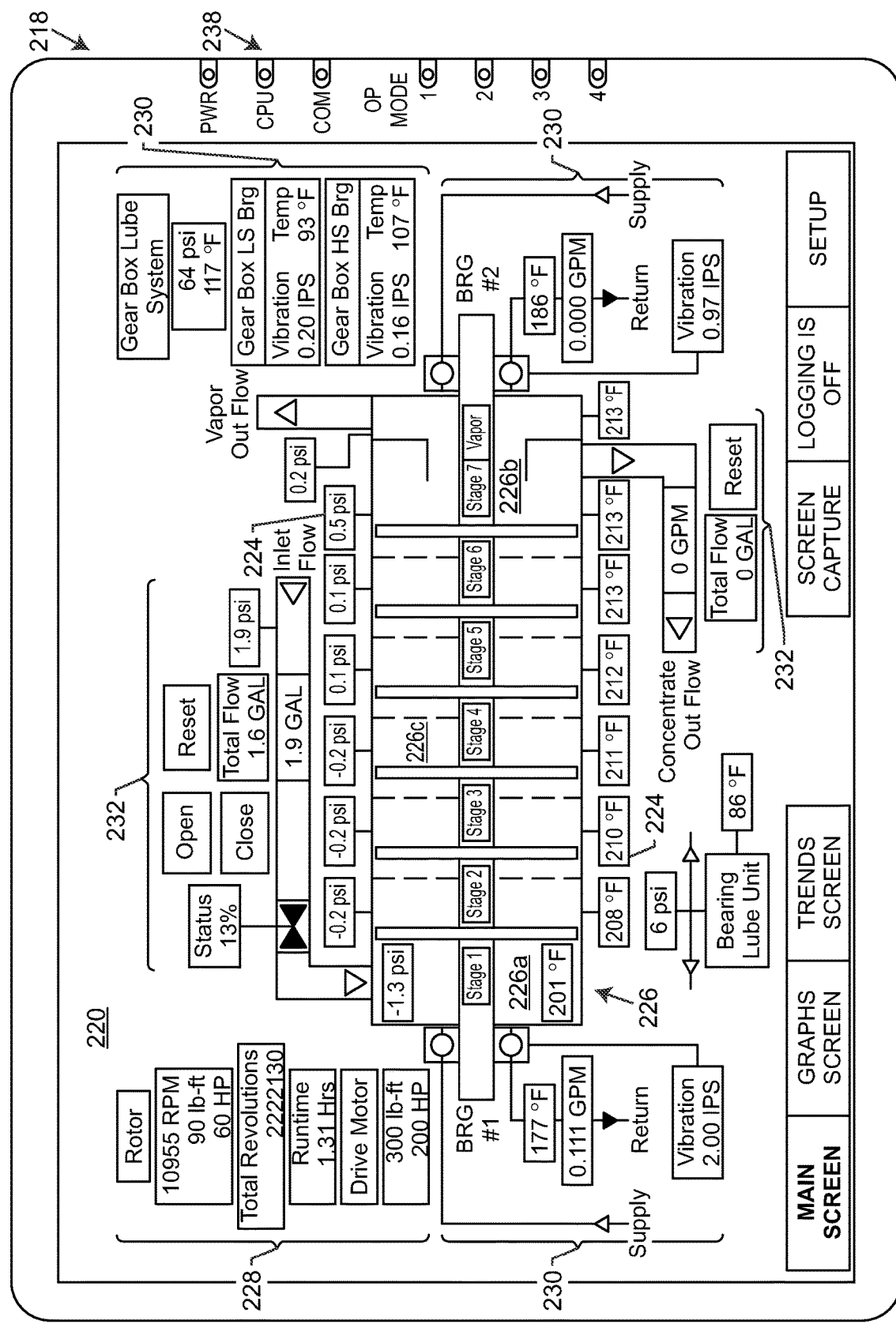
FIG. 38 is a schematic illustration of the control system with graphical display of the main screen.

As shown in FIGS. 37 and 38, the system 10 may be controlled by a control system 218 that measures various operating parameters of the system 10. The control system 218 includes a graphical display 220 that is touch screen sensitive. The graphical display 220 can be used to adjust the power, torque, and rpms of the motor and shaft, as well as the flow rate of fluid entering the system 10. This graphical display 220 is similar to the graphical display depicted in FIG. 28. The graphical display 220 includes a schematic graphical depiction of the system 10 corresponding to various components thereof. The control system 218 and graphical display 220 described herein is an updated from the version of FIG. 28. The graphical display 220 includes indicator lights 238 around its border that indicate power, CPU activity, and operating modes, corresponding to the fluid being processed in the system 10, i.e., (1) brackish water, (2) sea water, (3) produced water, and (4) pasteurizing water.

The updated graphical display provides measurement data captured by a plurality of operating sensors 222 connected to the system 10, as well as an internal clock to measure operating time and determine a rate for any of the data measured by the operating sensors 222.

The operating sensors 222 include temperature and pressure sensors 224 associated with each of a plurality of processing stages 226 within the system 10. The processing stages may include an inlet stage 226a, an outlet stage 226b, and tray/baffle stages 226c associated with each operating pair of a tray 22 followed by a baffle 24. The operating sensors 222 also include rotational sensors 228 associated with the shaft 36 and the motor 32, 32a. The rotational sensors 228 are configured to measure revolutions per minute, torque, horsepower, runtime, and total revolutions. The operating sensors 222 may also include bearing sensors 230 associated with the bearings 38, 40 on either end of the shaft 36. The bearing sensors 230 are configured to measure temperature and flow rate of a lubricant passing through the bearings 38, 40, as well as vibration of the shaft 36. The operating sensors 222 may also include flow sensors 232 associated with the fluid inlet 18 and contaminant outlet 46. The flow sensors 232 are configured to measure an opened or closed state of a valve on the fluid inlet 18, flow rate in the fluid inlet 18 and concentrate outlet 46, and total fluid flow in the fluid inlet 18 and concentrate outlet 46.

Figure 39:
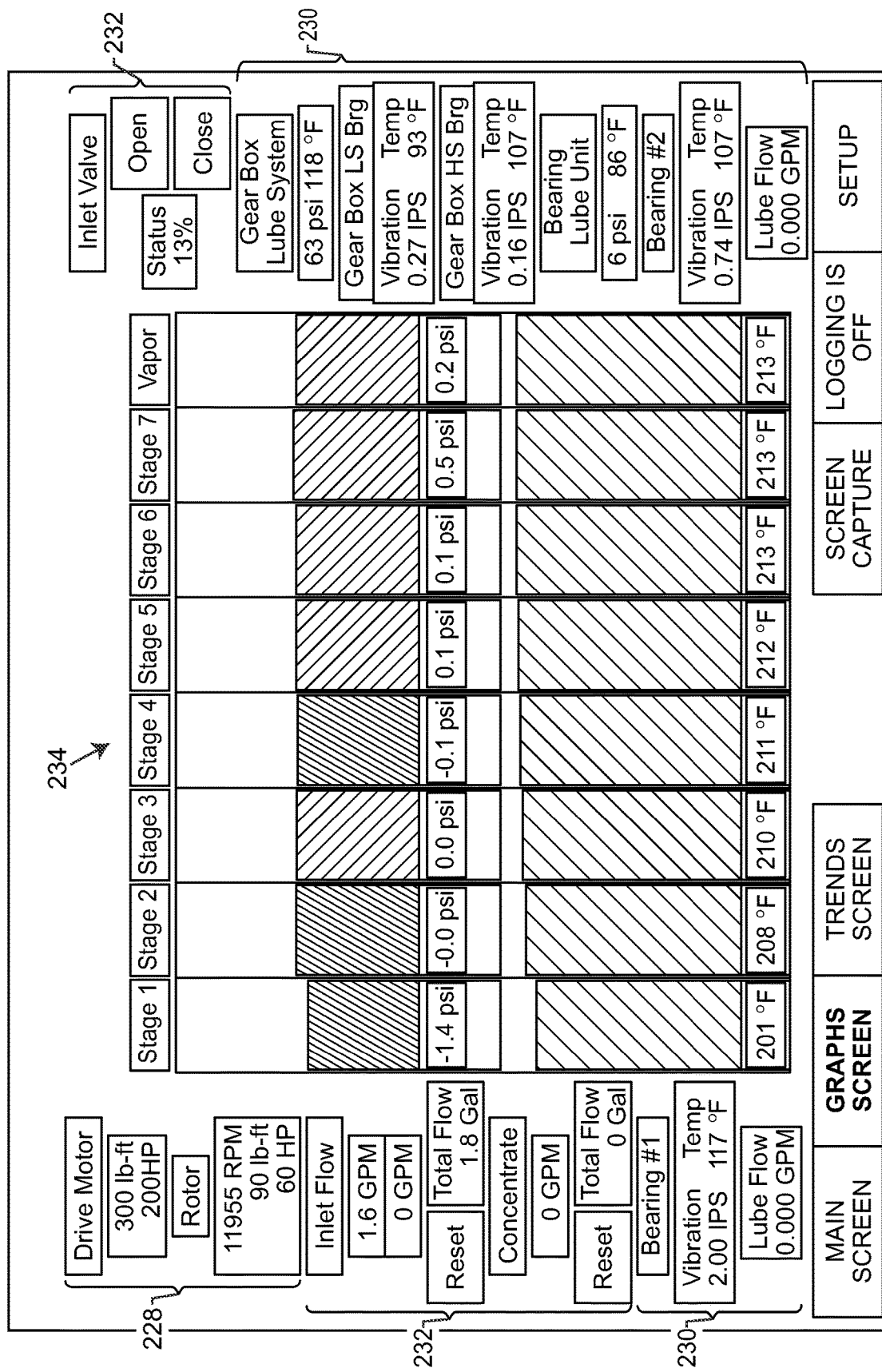
FIG. 39 is a schematic illustration of the control system with graphical display of the graphs screen.
Figure 40:
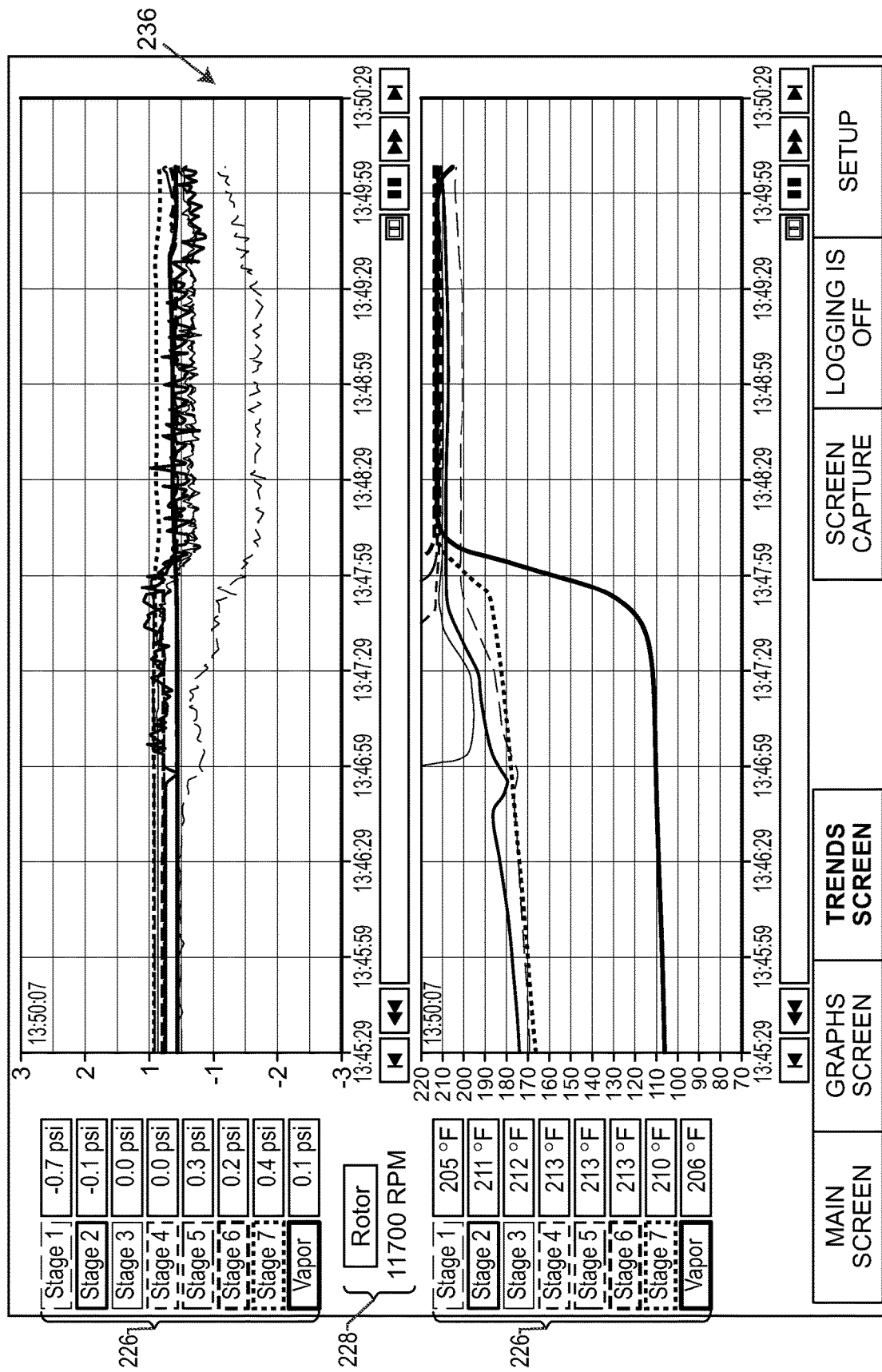
FIG. 40 is a schematic illustration of the control system with graphical display of the trends screen.

The graphical display 220 has several display modes. The main screen is shown in FIG. 38 and displays the values measured by the operational sensors 222 in the schematic illustration of the system 10. A graphs screen, shown in FIG. 39 displays the values measured by the temperature and pressure sensors 224 in a bar graph format 234 configured to represent the orientation of the plurality of operational stages 226. The graphs screen also displays numerical measurement values for the rotational sensors 228, the bearing sensors 230, and the flow sensors 232. A trends screen, shown in FIG. 40, displays a line graph 236 of the values measured by the temperature and pressure sensors 224 against time. On this line graph, each operational stage 226 associated with one of the temperature and pressure sensors 224 is depicted as a separate line. The line graphs may show present operational conditions or may be reviewed to show historical operational temperature and pressure data. The trends screen may also display data measured by the other sensors, including at least revolutions per minute of the rotor from the rotational sensors 228. The display screen 220 also has functionality to capture an image of the graphical display, as well as, to regulate whether data logging is on or off.

Figure 41:
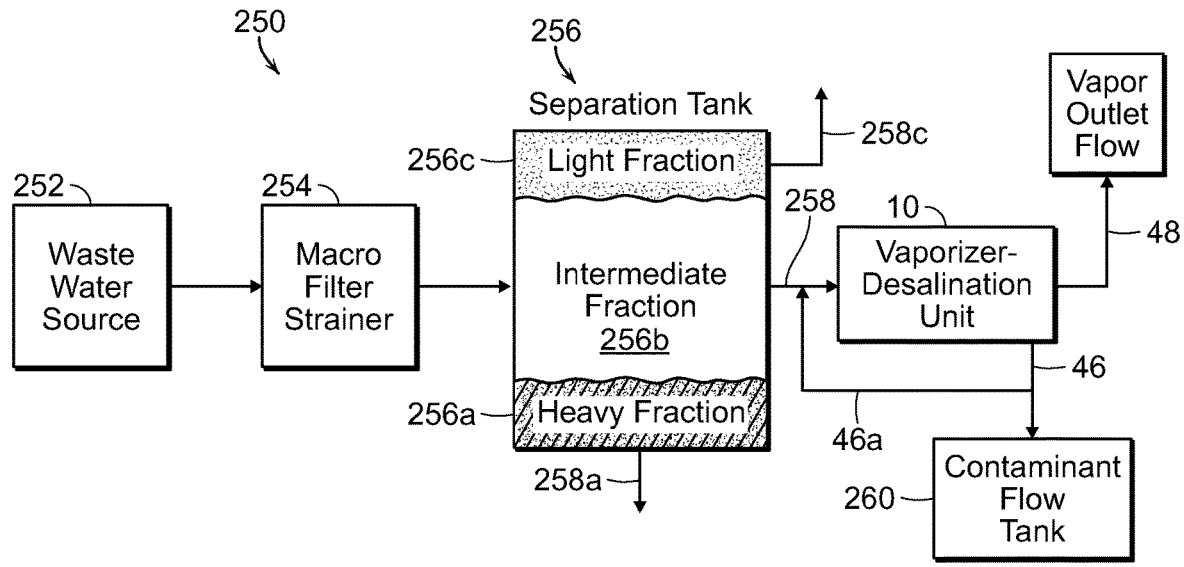
FIG. 41 is a flow chart illustration of wastewater purification system and process according to the present invention.
Figure 42:
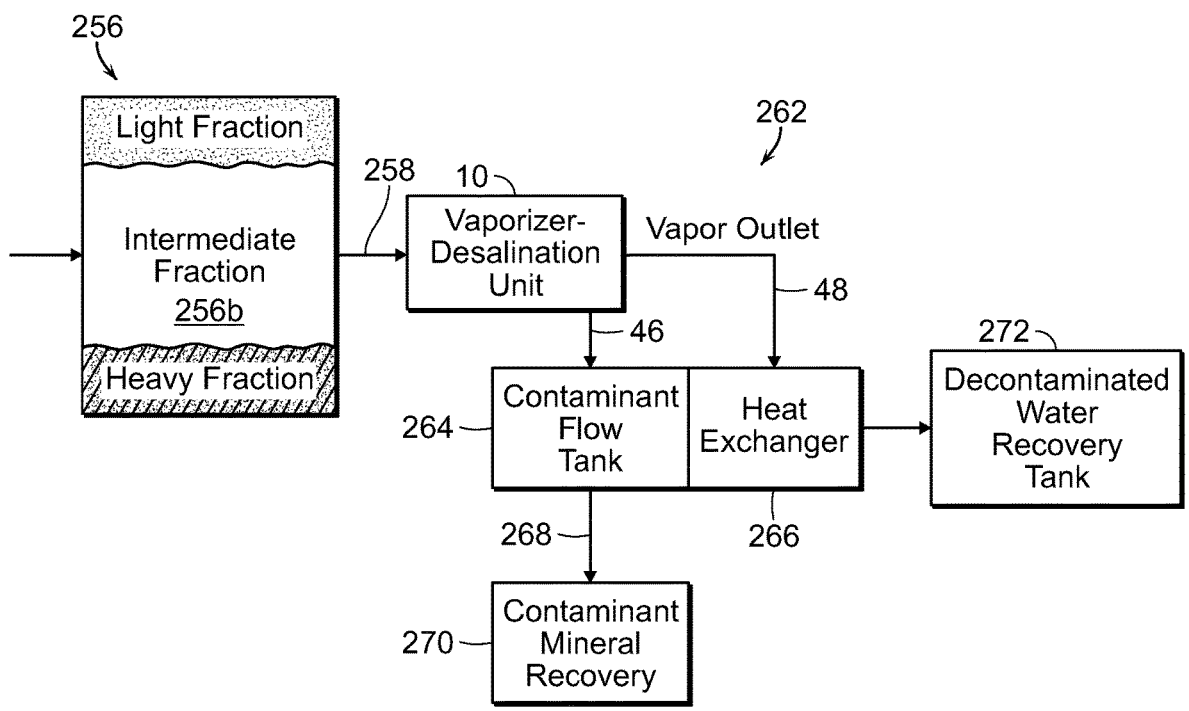
FIG. 42 is a flow chart illustration of an alternate embodiment of a wastewater purification system and process according to the present invention.

FIGS. 41 and 42 illustrate schematic flowcharts of preferred systems and methods for purifying a waste water source.

The system 250 of the first preferred embodiment, shown in FIG. 41, begins with a waste water source 252. The waste water source 252 can be any contaminated water source that typically needs to cleaned or purified, i.e., sewage, domestic wastewater, effluent, run-off, industrial waste, etc. The flow from the waste water source 252 is first passed through a macro filter-strainer 254 that is designed to remove large objects, i.e., rocks, branches, etc., from the flow. The goal is to remove solid objects that might be too large to pass through the remainder of the system 250.

After the macro filter-strainer 254, the waste water flow passes into a separation tank 265. The separation tank 256 relies on weight or density differences to allow for the waste water flow to separate into different regions, i.e., a heavy fraction region 256a at the bottom, an intermediate fraction region 256b in the middle, and a light fraction region 256c at the top. The heavy fraction is typically sludge or similar solid or semi-solid contaminants. The light fraction is typically oil or similar lighter contaminants. The waste water flow removed from an intermediate fraction outlet 258 in the intermediate region 256b is passed on for further processing. The tank 256 also includes a heavy fraction outlet 258a and a light fraction outlet 258c, whereby both fractions may be removed when needed. The intermediate fraction outlet 258 is preferably disposed in the intermediate fraction region 256b, but close to the heavy fraction region 256a to maximize the accessibility of the intermediate fraction.

The waste water flow from intermediate outlet 258 enters vaporizer-desalination unit 10 constructed as described above and is processed in the same manner as described above. The contaminant outlet flow 46 is directed to contaminant flow tank 260 for storage or subsequent processing. The vapor outlet flow 48, having been purified, is directed elsewhere for subsequent processing, where it is condensed for use in clean water systems, including but not limited to potable or irrigation water. Optionally, the contaminant outlet flow 46 may be recycled—in whole or in part—via recycle line 46a back through the vaporizer-desalination unit 10 for further purification. Rather than recycling, the contaminant outlet flow 46 may be processed through a second vaporizer-desalination unit 10 set-up in series with the first unit.

Use of the vaporizer-desalination unit 10 allows for the elimination of conventional filtration systems and chemical process treatments found in typical water treatment plants. Such systems and treatments typically involve chemicals and/or reverse osmosis and similar filtration systems that are expensive to operate and maintain. Use of the inventive system 250 reduces or eliminates these expenses.

A second embodiment of the water purification system 262 is shown in FIG. 42. The second system 262 is the same as the first system 250 up through the separation tank 256 and the vaporization-desalination unit 10. In this second system 262, the contaminant outlet flow 46 is directed into a contaminant flow tank 264. The contaminant flow tank 264 includes heat exchanger pipes 266 that are connected to the vapor outlet flow 48. The heat from the vapor outlet flow 48 dries the contaminant outlet flow 46. The dried contaminant outlet flow 268 is then sent to further processing for contaminant mineral recovery 270. After the heat exchanger pipes 266, the vapor outlet flow 48 has been cooled and is sent to a decontaminated water recovery tank 272.

It has been found that initial processing through a vaporizer-desalination unit 10 in either system 250, 262 purifies approximately 75% of the water content in a contaminated water flow. A second round of processing through such a unit 10 will purify approximately 75% of the remaining contaminated flow. The combined processing results in over 90% purified water content from a waste water source.

Although several embodiments have been described in detail for purposes of illustration, various modifications may be made without departing from the scope and spirit of the invention. Accordingly, the invention is not to be limited, except as by the appended claims.

What is claimed is:

1. A system for decontaminating wastewater, comprising:
a wastewater source fluidly connected to an inlet on a wastewater filter-strainer device producing a filtered wastewater flow;
a separation tank fluidly connected to an outlet on the wastewater filter-strainer device, wherein the separation tank divides the filtered wastewater flow into a heavy fraction, a light fraction, and an intermediate fraction;
a first decontamination unit comprising a generally horizontal elongated vessel having a plurality of alternately spaced rotating trays and fixed baffles disposed vertically along the elongated vessel between a first end of the elongated vessel proximate to a first wastewater inlet and a second end of the elongated vessel proximate to a first contaminant outlet and a first vapor outlet; and
wherein the first wastewater inlet on the first decontamination unit is fluidly connected to an intermediate outlet on the separation tank and separates the intermediate fraction into a contaminant flow to the first contaminant outlet and a decontaminated vapor flow to the first vapor outlet.

2. The system of claim 1, further comprising a contaminant tank fluidly connected to the first contaminant outlet, and heat exchanger tubes fluidly connected to the first vapor outlet and thermally connected to the contaminant tank, wherein heat from the decontaminated vapor flow in the heat exchanger tubes dries the contaminant flow in the contaminant tank to a contaminant mineral residue.

3. The system of claim 2, further comprising a decontaminated water recovery tank fluidly connected to the heat exchanger tubes after the contaminant tank.

4. The system of claim 2, further comprising a mineral separator connected to an outlet on the contaminant tank, wherein the mineral separator operates to separate the contaminant mineral residue into commercial minerals.

5. The system of claim 1, further comprising a recycle line fluidly connecting the first contaminant outlet to the first wastewater inlet on the first decontamination unit.

6. The system of claim 5, wherein the recycle line diverts at least seventy-five percent of the contaminant flow to the first wastewater inlet.

7. The system of claim 1, wherein each of the plurality of trays in the first decontamination unit has a plurality of scoops each having an inlet of a first diameter and an outlet of a second smaller diameter, and each of the plurality of baffles in the first contamination unit has a plurality of apertures each having an inlet of a first diameter and an outlet of a second smaller diameter.

8. The system of claim 1, wherein the first decontamination unit further comprises an internal sleeve disposed in the elongated vessel downstream of the plurality of trays and plurality of baffles, the internal sleeve forming an annular passageway to the first contaminate outlet.

9. The system of claim 1, further comprising a second decontamination unit comprising a generally horizontal elongated vessel having a plurality of alternately spaced rotating trays and fixed baffles disposed vertically along the elongated vessel between a first end of the elongated vessel proximate to a second wastewater inlet and a second end of the elongated vessel proximate to a second contaminant outlet and a second vapor outlet, wherein the second wastewater inlet is fluidly connected to the first contaminant outlet on the first decontamination unit, the second contaminant outlet is fluidly connected to a contaminant tank, and the second vapor outlet is fluidly merged with the first vapor outlet.

* * * * *